Nov. 26, 1929.  J. W. HULME  1,737,422
ZONING AND FARE COLLECTING SYSTEM
Filed Jan. 21, 1927  16 Sheets-Sheet 1
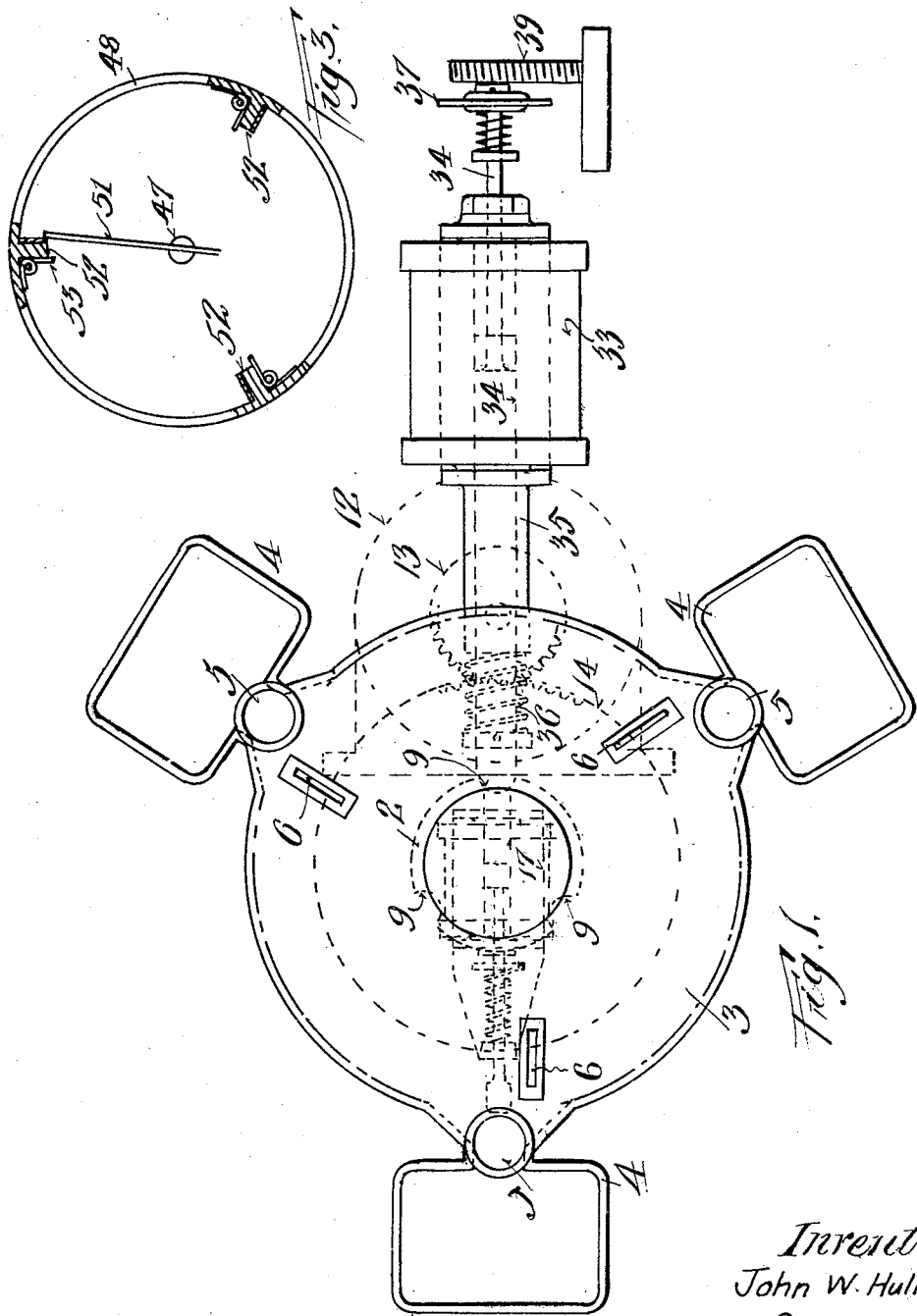
Inventor
John W. Hulme
By his Attorneys Darby & Darby

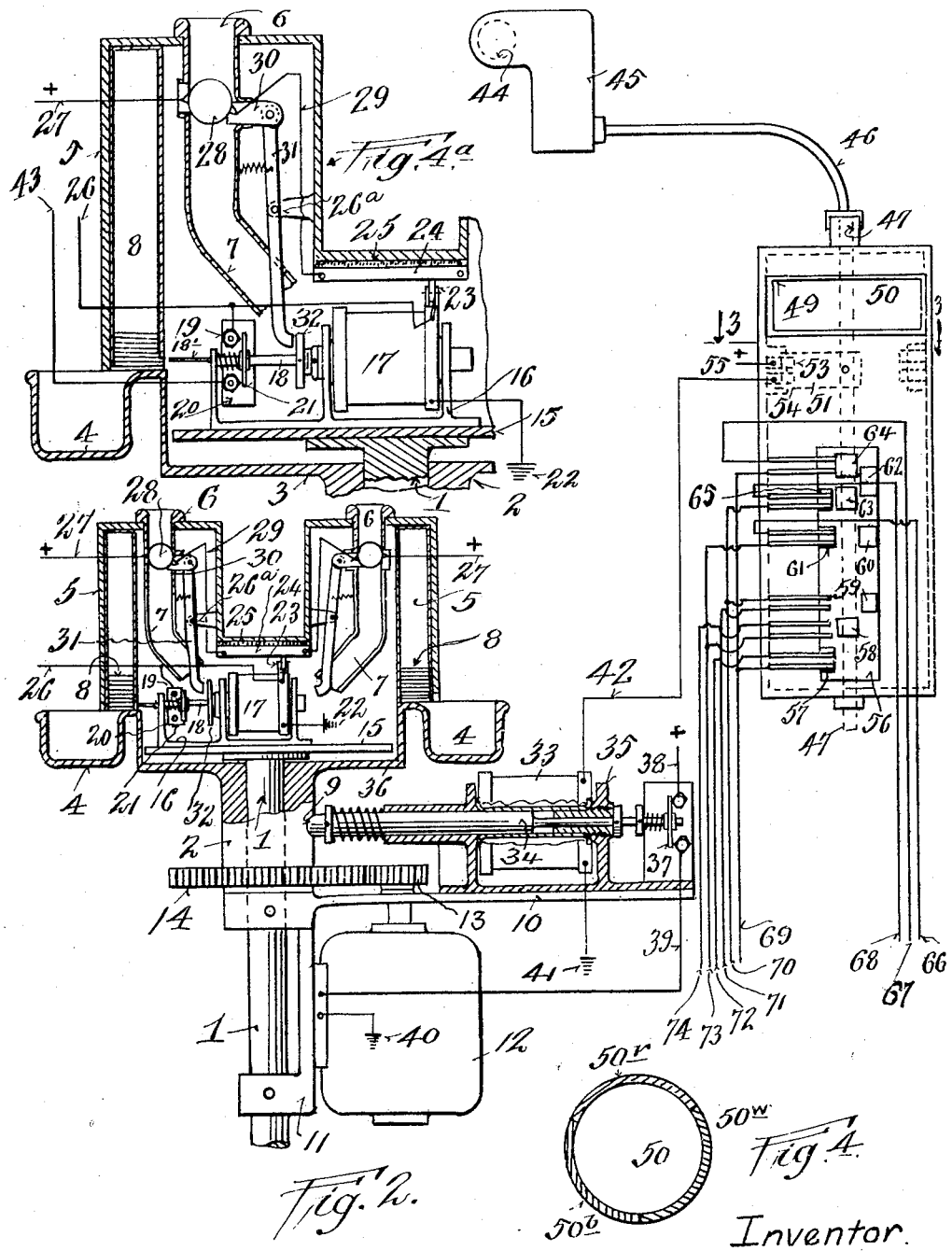

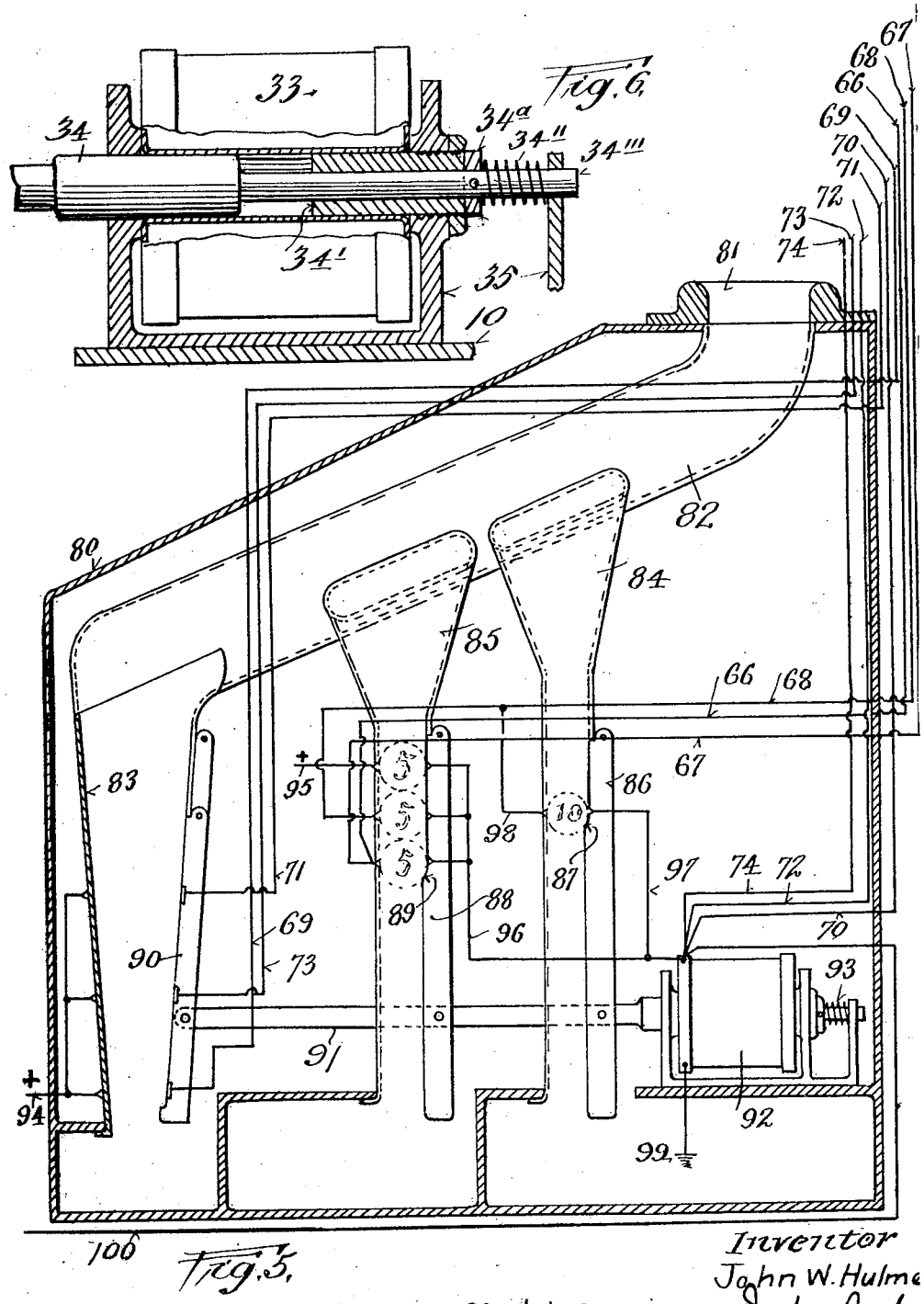

Nov. 26, 1929.   J. W. HULME   1,737,422
ZONING AND FARE COLLECTING SYSTEM
Filed Jan. 21, 1927   16 Sheets-Sheet 4
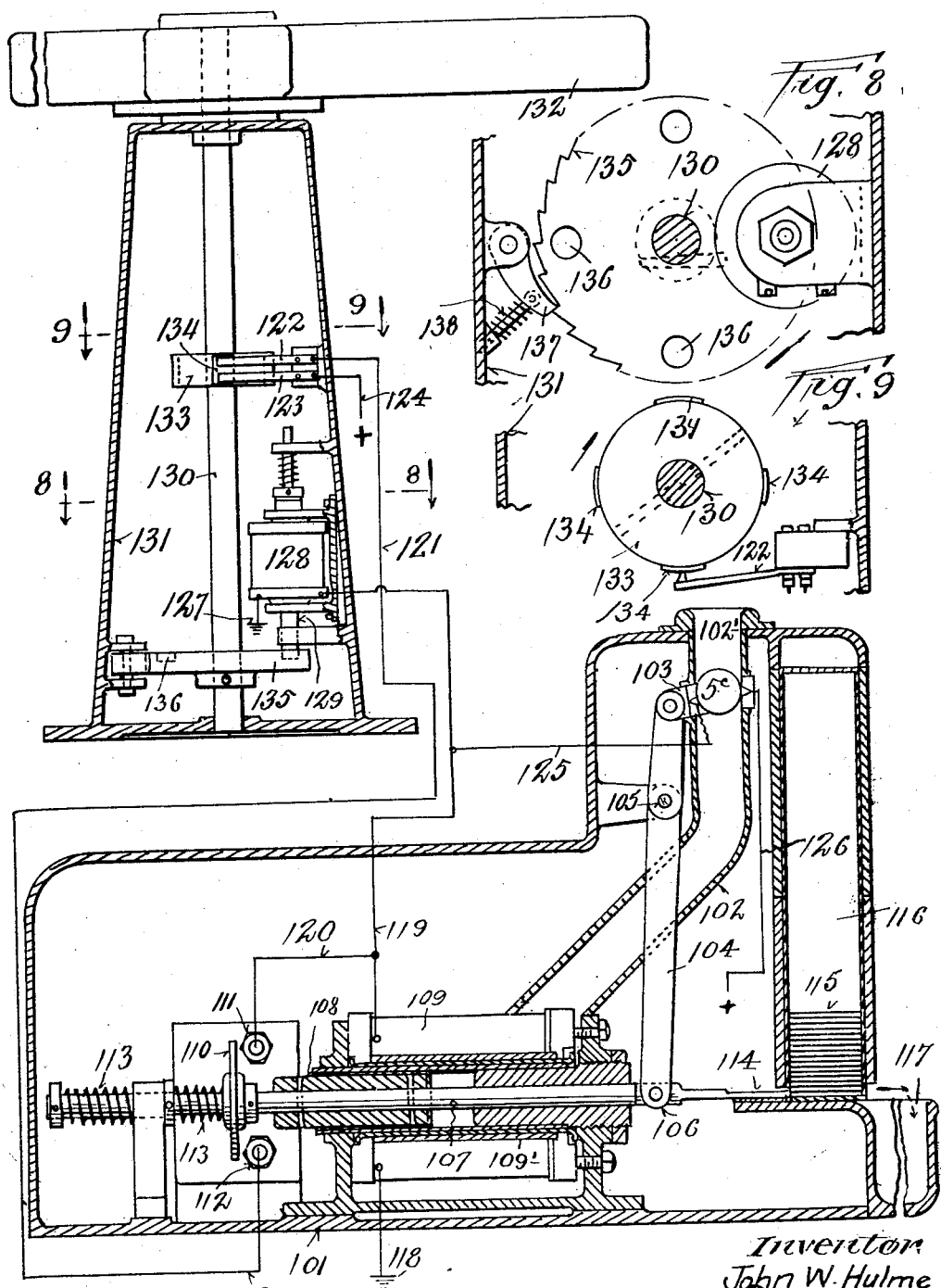

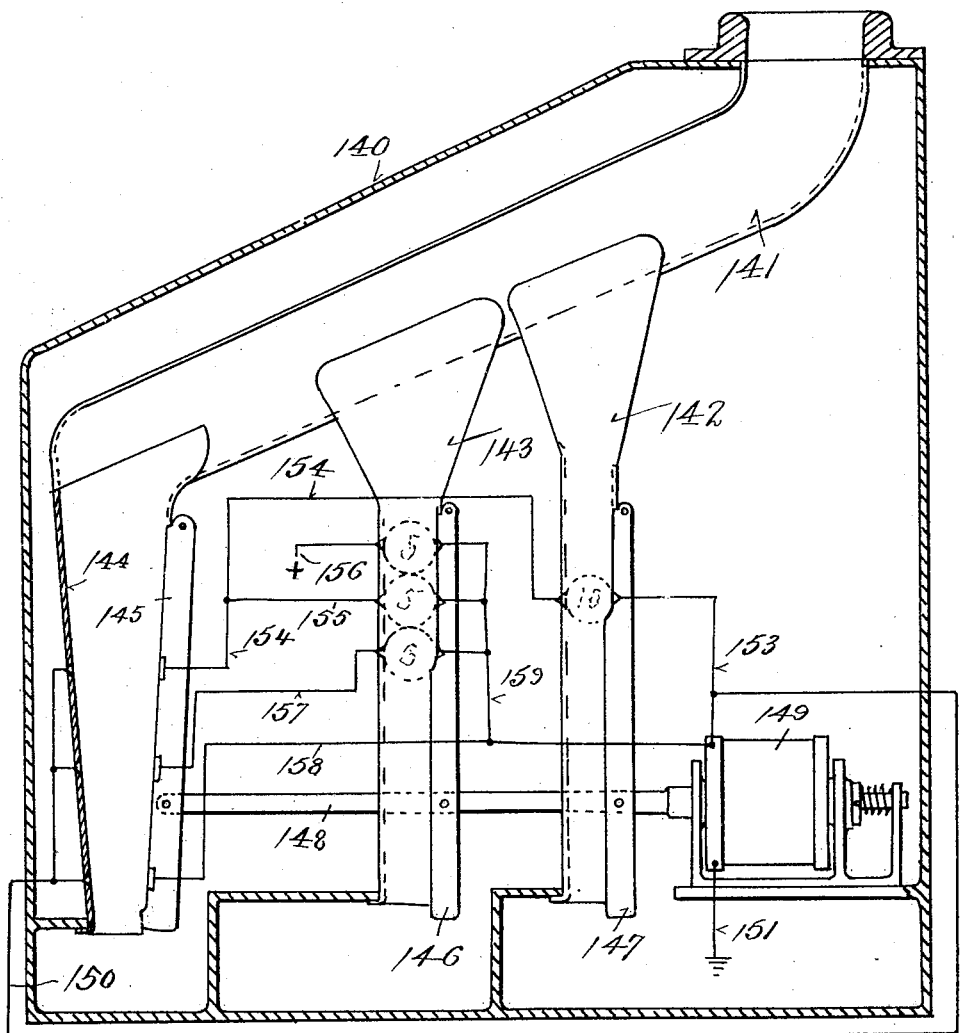

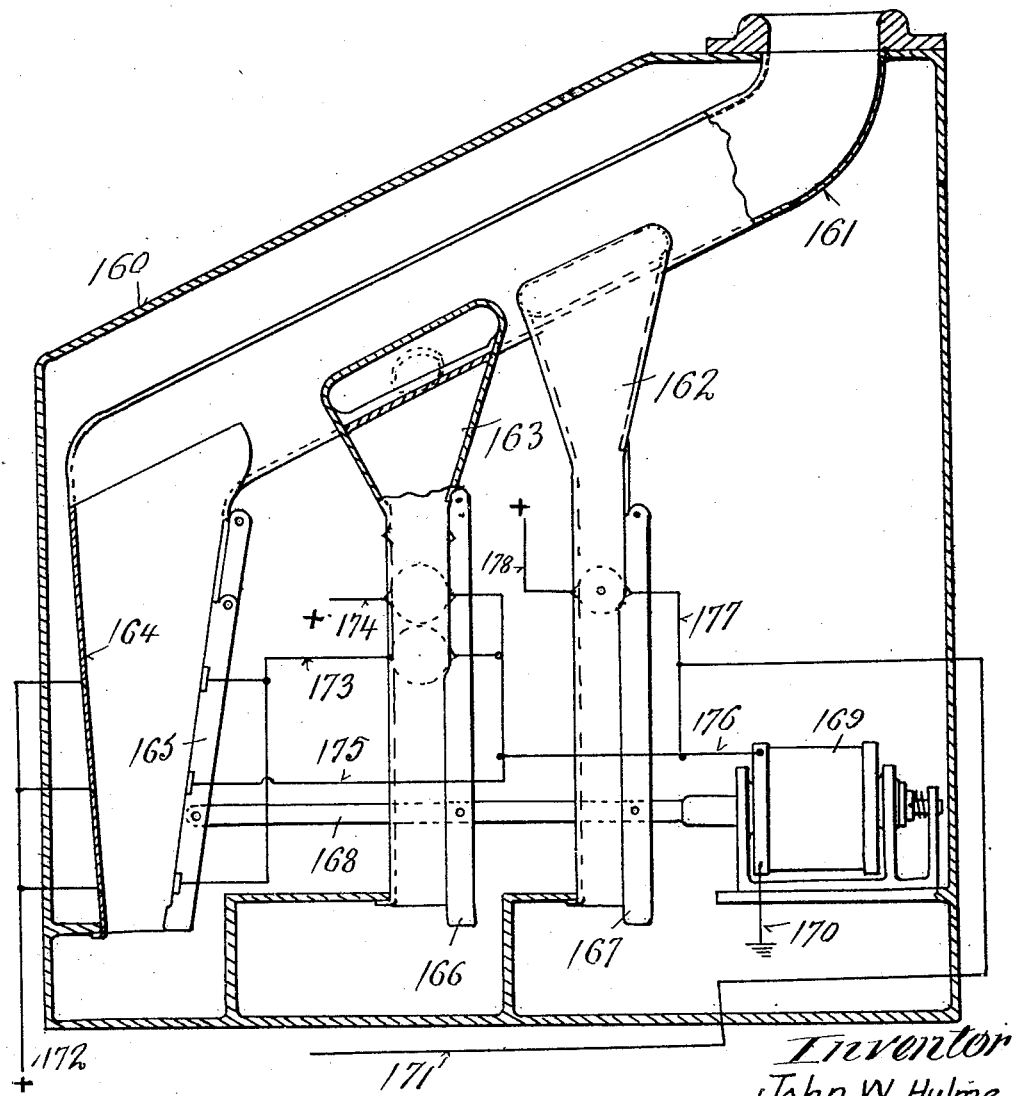

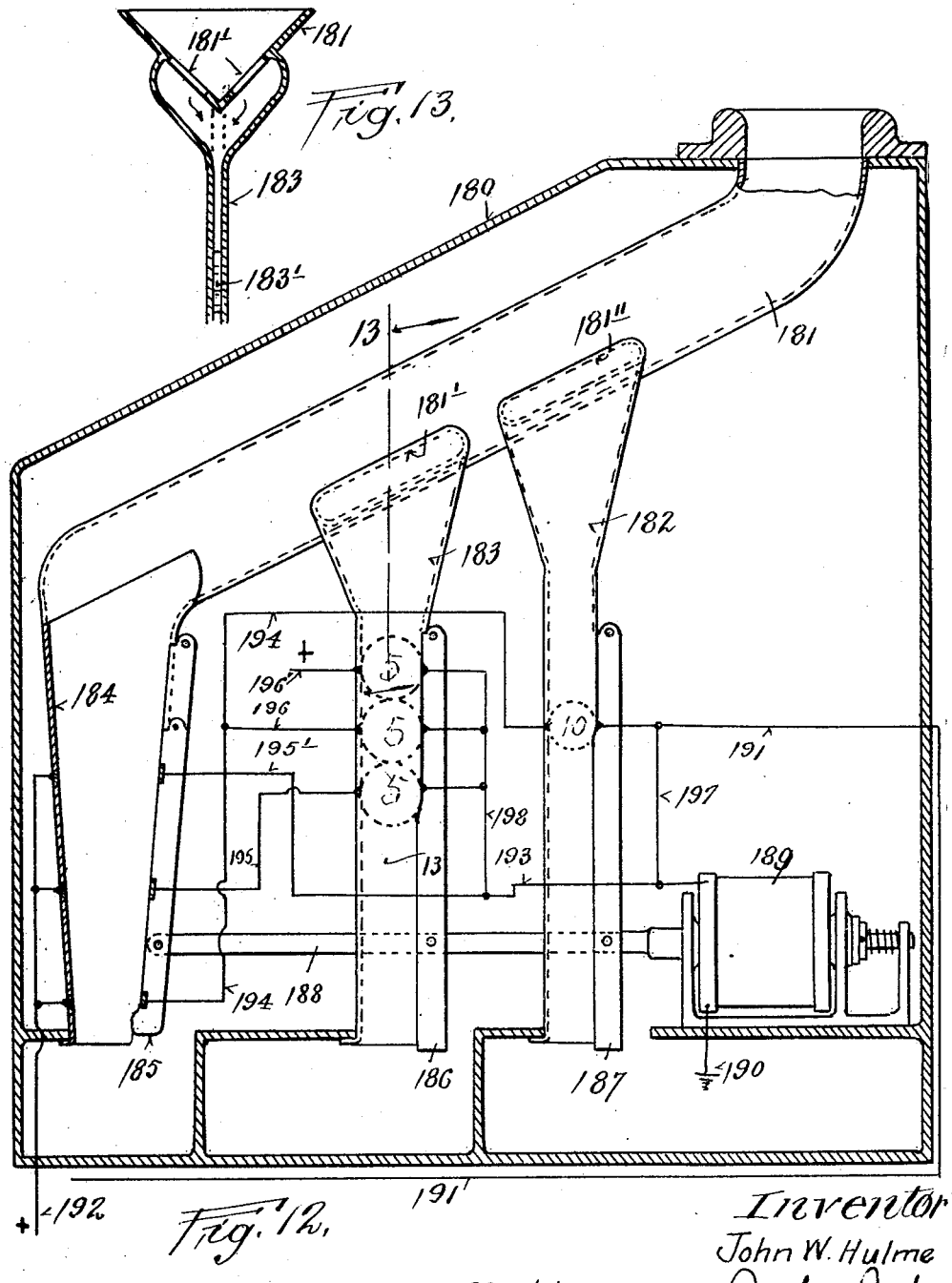

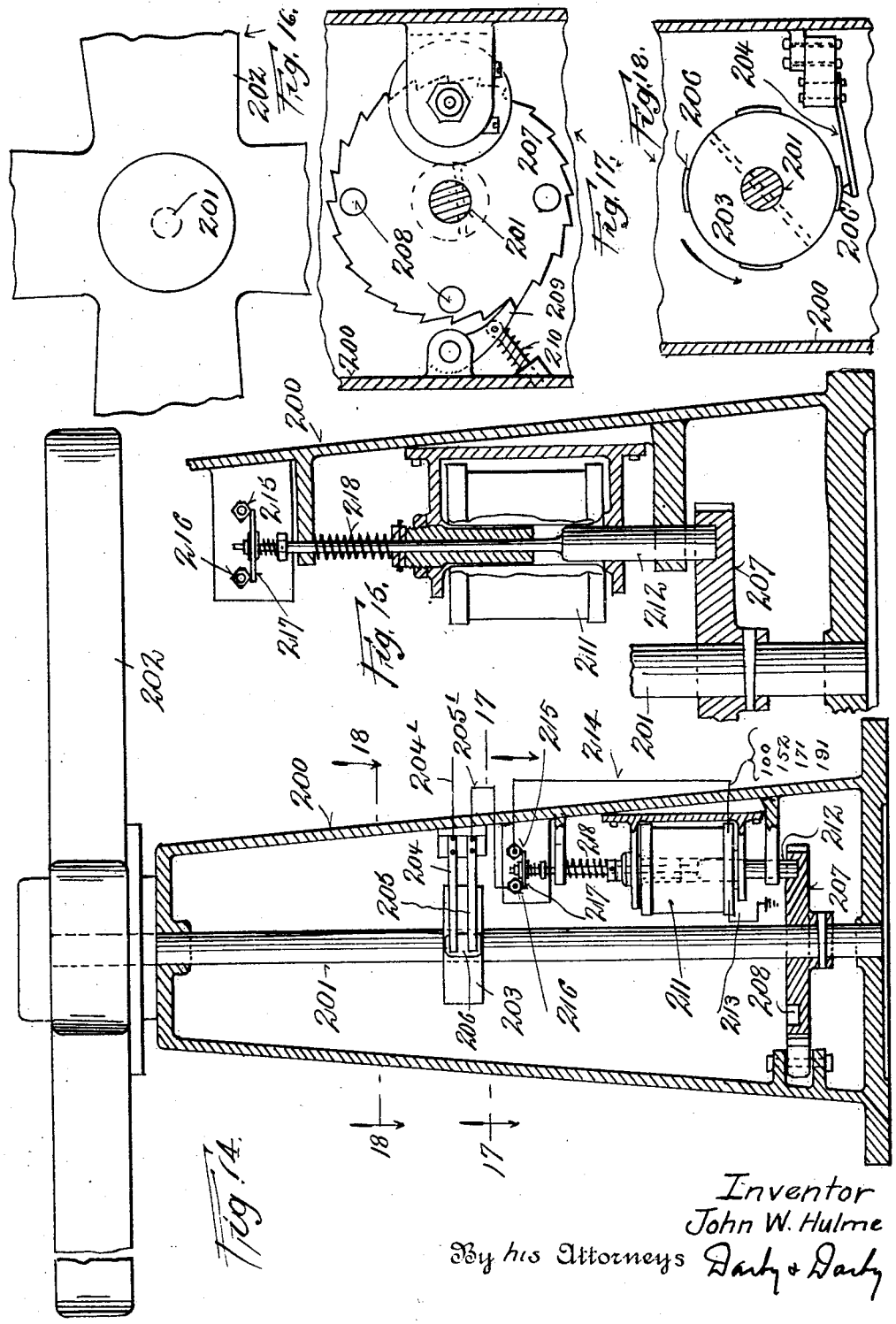

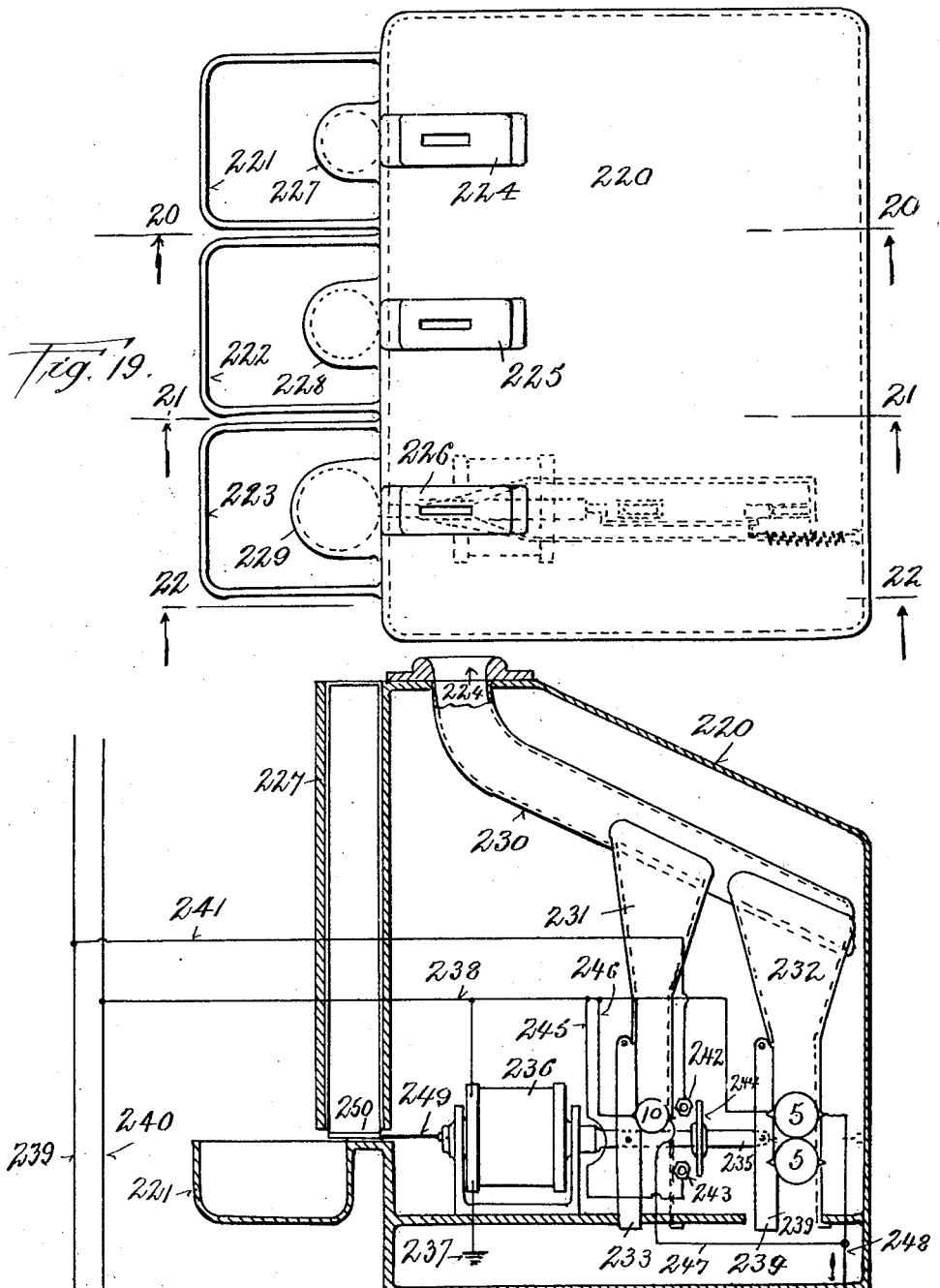

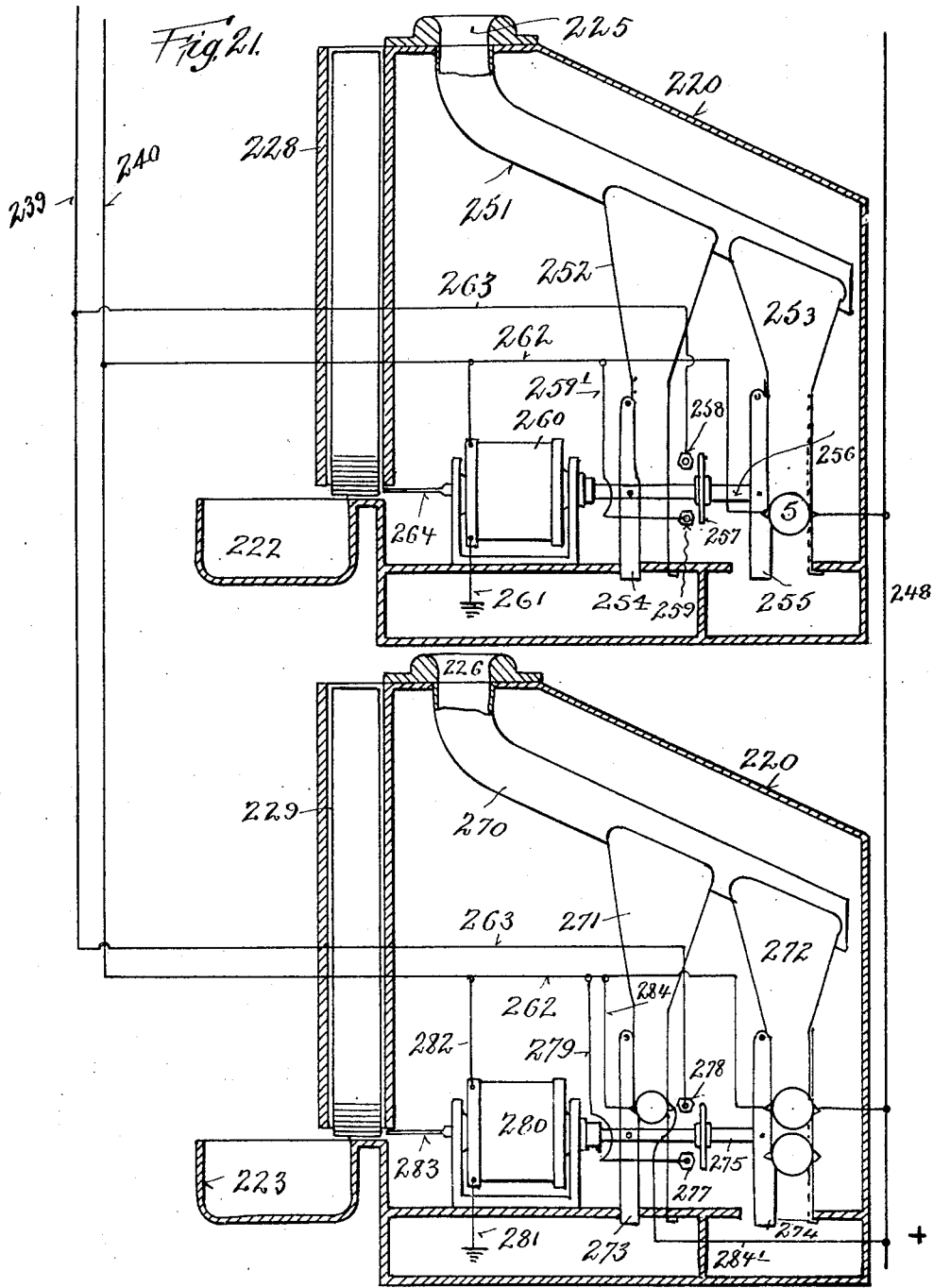

Inventor
John W. Hulme
By his Attorneys Darby & Darby

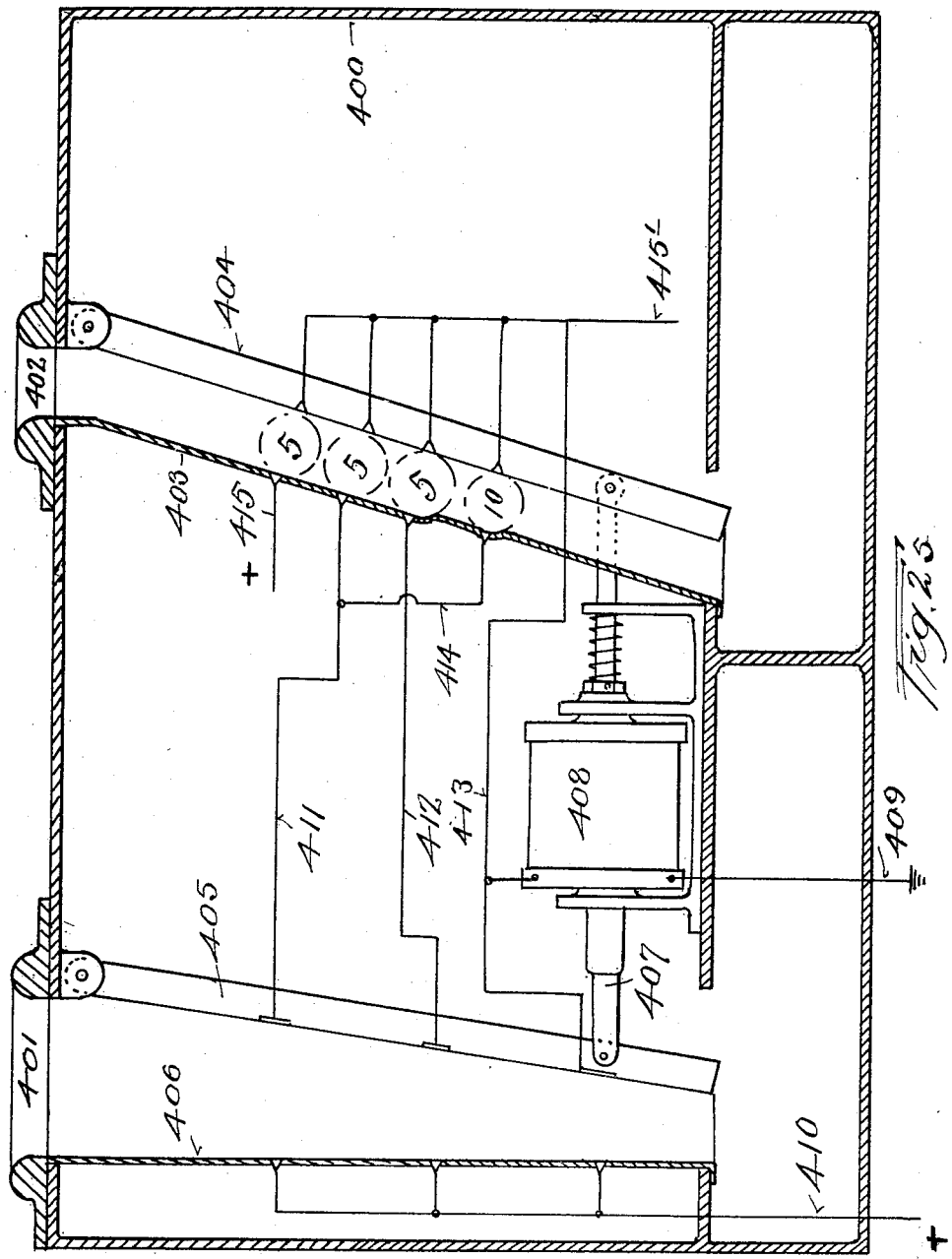

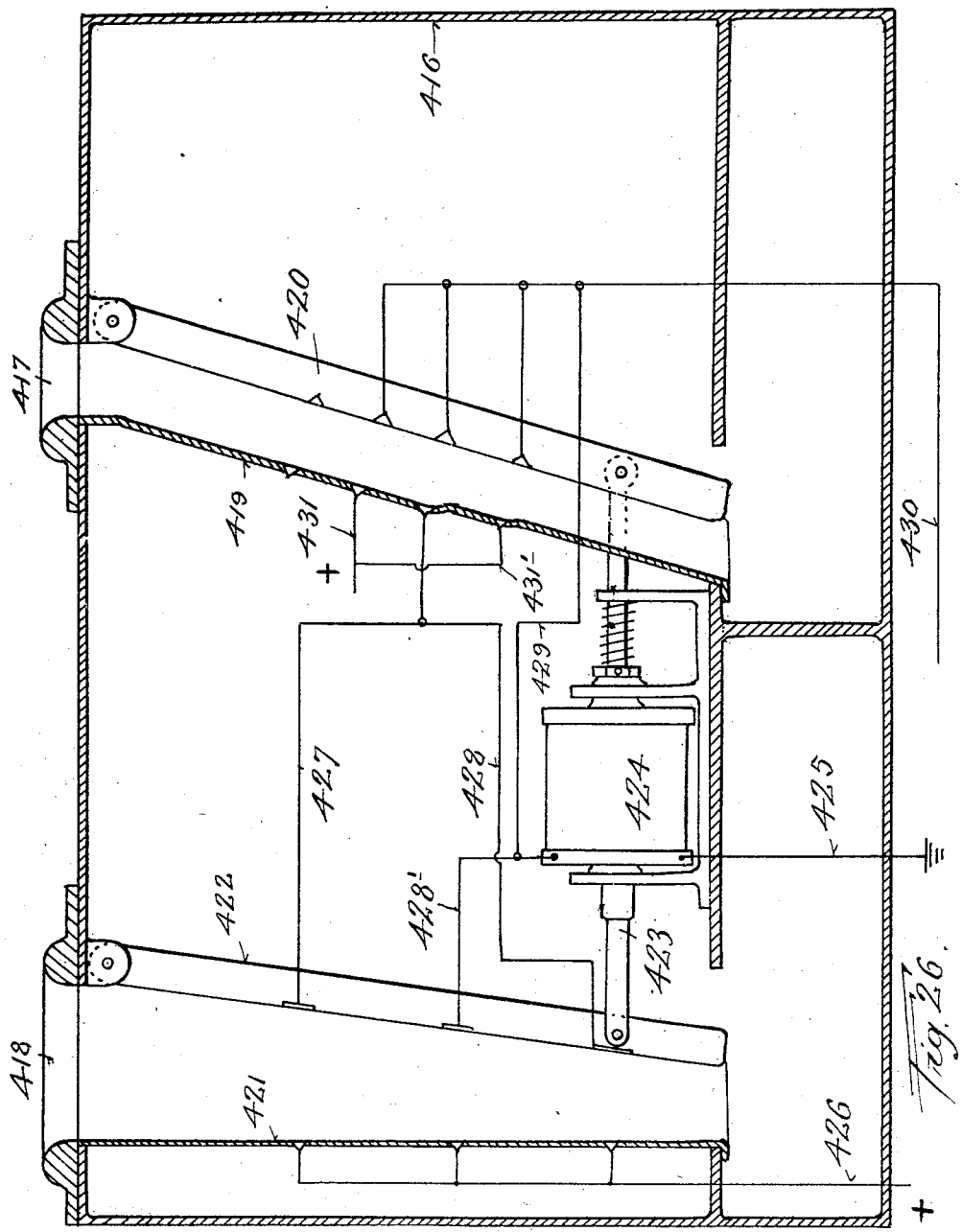

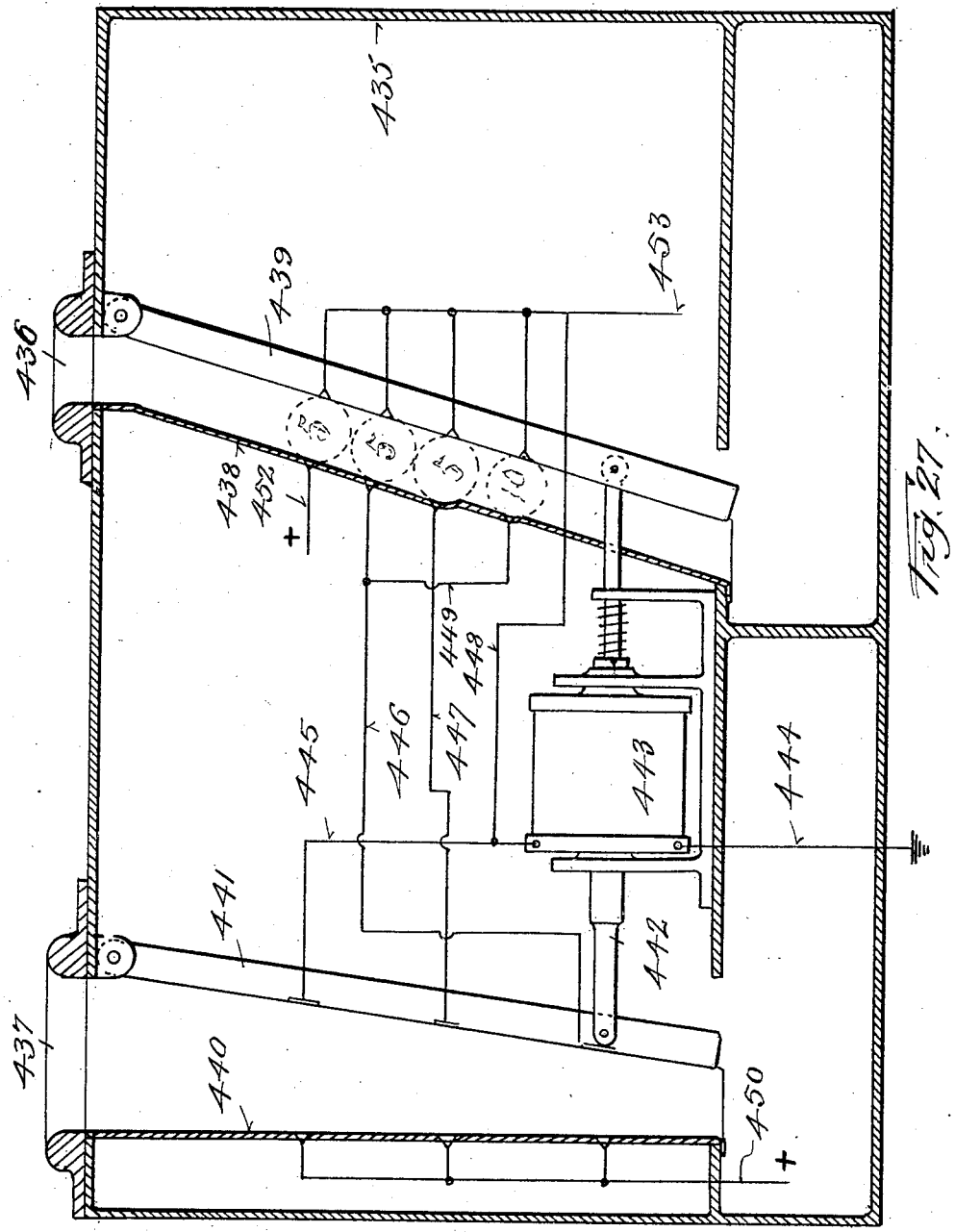

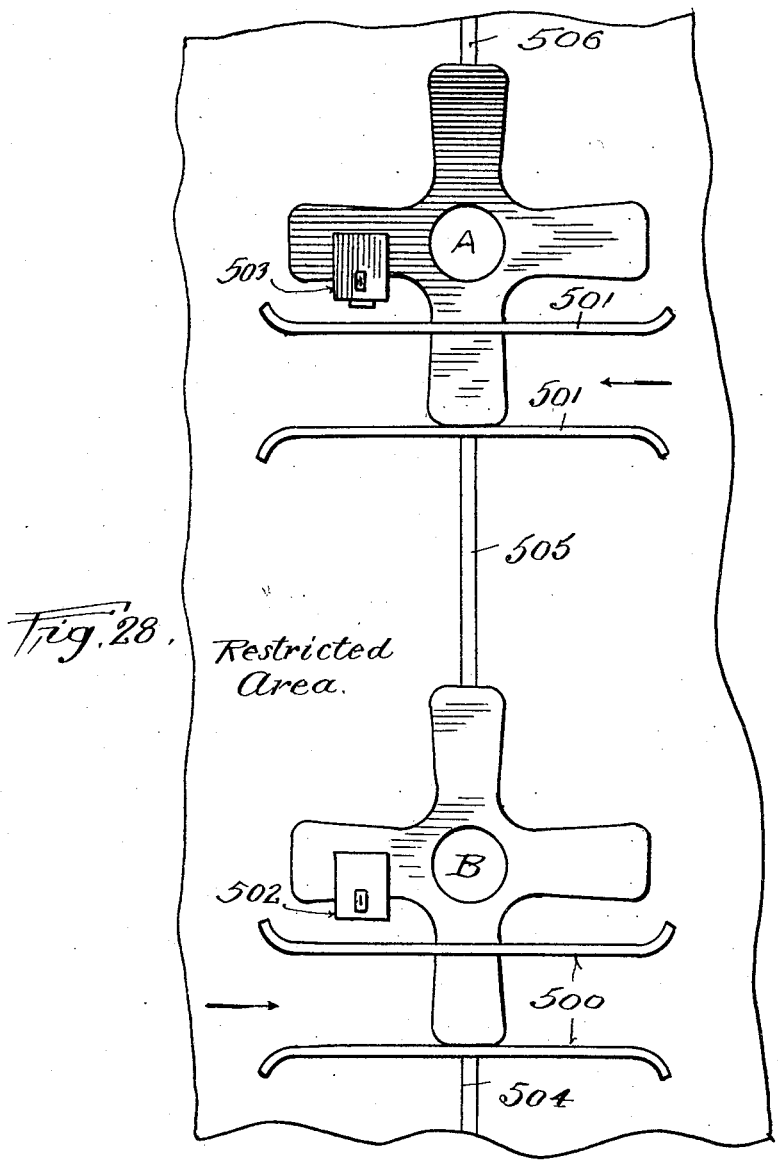

Patented Nov. 26, 1929

1,737,422

UNITED STATES PATENT OFFICE

JOHN W. HULME, OF JACKSON HEIGHTS, NEW YORK

ZONING AND FARE-COLLECTING SYSTEM

Application filed January 21, 1927. Serial No. 162,581.

This invention relates broadly to apparatus and means for separating passenger vehicle or common carrier systems into sections or zones to provide a basis for charging passengers in accordance with the distance they travel.

One of the objects of this invention is the provision of equipment adapted for application to present passenger vehicle systems such as railroads, subways, elevated lines, streetcar lines, ferries and the like to provide fare collection apparatus whereby the passengers pay an amount in reasonable and approximate proportion to the length of their trip.

A further object of this invention is to provide apparatus which may be readily applied to buses and similar passenger vehicles to automatically divide the trip into predetermined zones in order that a fare may be charged in accordance with the length of the trip.

A still further object of this invention is to provide equipment as generally indicated above by means of which a passenger may deposit the necessary coins therein and receive a token representing by physical characteristics, such as color, size, configuration or material the particular zone of the system in which the passenger enters the system for transportation.

Another object of this invention is the provision of a turnstile apparatus operated by the deposit of a coin to permit the passenger to enter a restricted area through which the transportation system runs or to enter a carrier of any kind upon the deposit of the proper coin.

A still further object of this invention is to provide a coin operated device for effecting both the delivery of a token and the admission of a passenger to a point of access to the vehicle or to the vehicle itself.

Another object of this invention is to provide a device operated in conjunction with exit turnstiles to permit the exit of a passenger from the restricted area or a carrier upon the deposit of the token which he received on entering the system or upon the deposit of coins of sufficient amount or upon the deposit of a token and additional coins of sufficient amount.

A still further object of the invention is to provide equipment for use on buses and the like which is operated from the drive-shaft or wheels or other moving part of the vehicle to effect automatic rearrangement thereof upon passing from one zone to another to adapt it for delivery of a token representative of the zone in which the bus is traveling.

Another object of this invention is to provide indicating means on a bus to indicate to the passengers when the bus is about to leave one zone and enter another.

A still further object of this device is to provide entrance and exit turn stiles of a particular form adapted to co-operate with coin controlled entrance equipment and coin or token controlled exit equipment.

A still further object of this invention is to provide coin controlled token delivering apparatus having a plurality of token magazines that is one for each zone of the system so that a passenger, by depositing the amount required to travel to any particular zone will get a token which will permit his exit from the zone represented by that token upon its deposit in suitable equipment, plus a required amount of money in coins or additional tokens.

These and many other objects which will become apparent from the following description are secured by the present invention.

This invention resides substantially in the system, combination, construction, arrangement, circuital connections and relative location of parts as will be apparent from the following disclosure.

Referring to the drawings where the same reference numerals have been used in corresponding views wherever possible to indicate the same or similar parts:

Figure 1 represents a top plan view of the coin controlled token delivering device used on buses employing my invention;

Fig. 2 represents a vertical cross sectional view of the bus token delivering device and a plan view of the drum switch to be driven from the drive-shaft;

Fig. 3 is a cross sectional view taken on the line 3—3 of Fig. 2 looking in the direction of the arrows showing the switch for controlling the position of the token delivering device;

Fig. 4 represents a cross sectional view of the zone indicating device operated by the movement of the drum switch;

Figure 23:
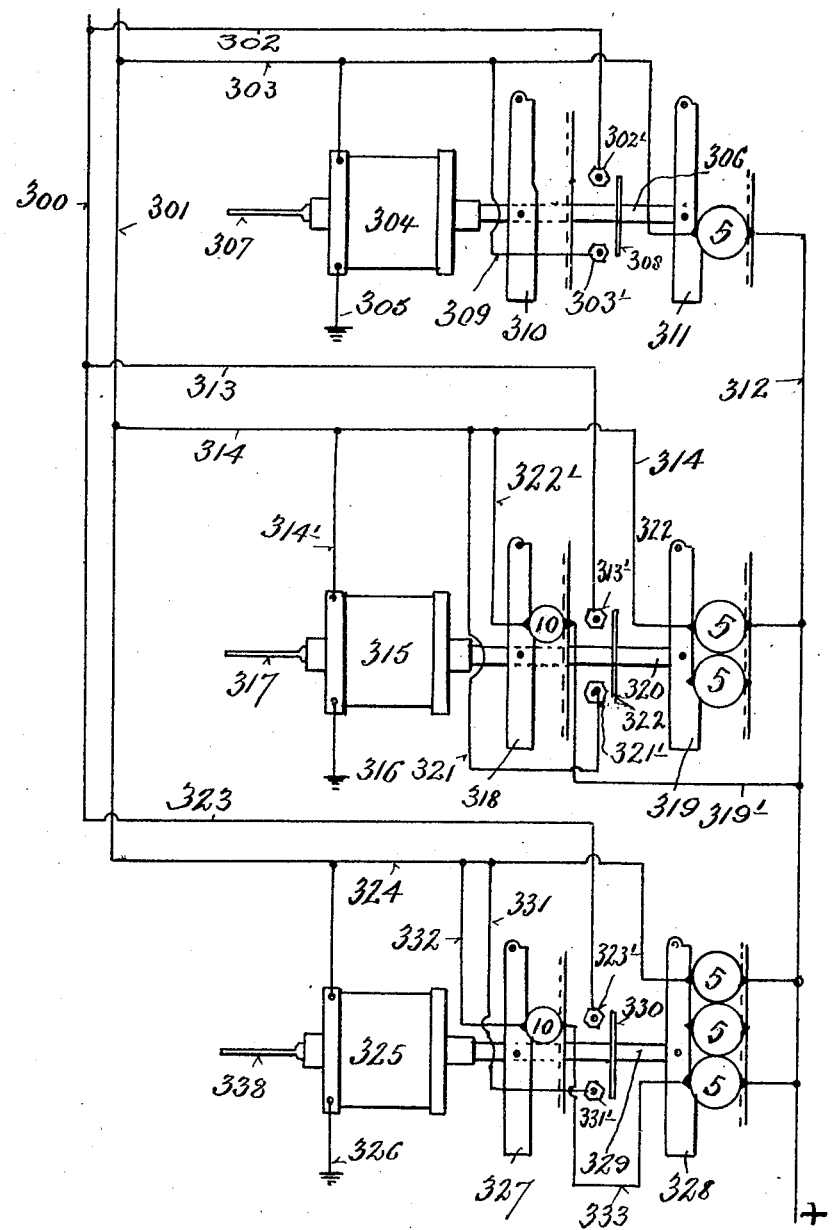

Fig. 4ª represents an enlarged vertical cross sectional view of one of the token delivering devices disclosed in the arrangement of Figs. 1 and 5;

Fig. 5 is a cross sectional view through the casing of the coin and token operated device for controlling the exit movement of a passenger from a bus and the like showing diagrammatically the circuit connections to the various parts.

Fig. 6 is an enlarged view partly in cross section of the electro-magnetic equipment used on the coin or token operated equipment for releasing the coin or token after it has performed its function;

Fig. 7 represents a vertical cross sectional view of a coin controlled token delivering device for use on railways, street-cars, subways, elevated lines and the like showing its operative relation with respect to the entrance turnstile which is also shown in vertical cross sectional view;

Fig. 8 is a cross sectional view taken on the line 8—8 of Fig. 7 showing the ratchet wheel and magnet control for permitting the movement of the turnstile as a passenger passes thereby.

Fig. 9 is a cross sectional view taken on the line 9—9 of Fig. 7 looking in the direction of the arrows showing the drum switch which provides a holding circuit for the turnstile control magnet;

Fig. 10 is a vertical cross sectional view of the coin and/or token controlled device for use in conjunction with the exit turnstile, of zone 1;

Fig. 11 is a similar view of a similar device electrically wired to permit its use in connection with the exit turnstile of zone 2;

Fig. 12 is a similar view of a similar device showing the electrical connections to permit its co-operation with the exit turnstile of zone 3;

Fig. 13 is a cross sectional view taken on the line 13—13 of Fig. 12 looking in the direction of the arrows showing the construction of the coin chute;

Fig. 14 is a vertical cross sectional view of an exit turnstile adapted for use on either train or bus systems;

Fig. 15 is an enlarged cross sectional view with some parts broken away of the electromagnetic equipment for controlling the operation of the exit turnstile;

Fig. 16 is a top plan view with the parts broken away of the barrier, forming part of the turnstile, which projects into a restricted passage-way;

Fig. 17 is a cross sectional view taken on the line 17—17 of Fig. 14 looking in the direction of the arrows showing the arrangement of the parts for controlling the movement of the turnstile.

Figure 24:
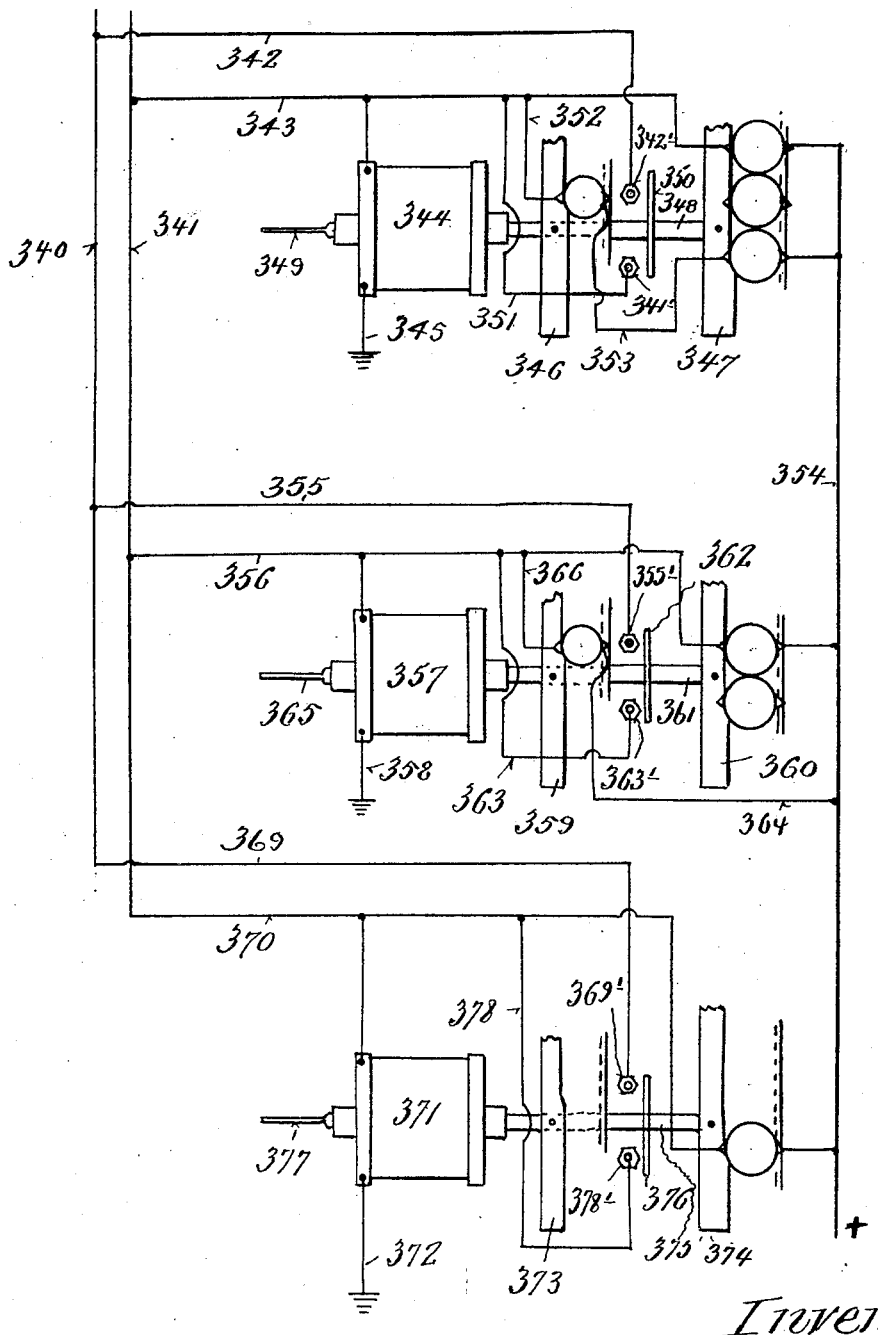

Fig. 18 is a view taken on the line 18—18 of Fig. 14 looking in the direction of the arrows showing the switch mounted on the turnstile for providing a holding circuit for the magnet which controls the turnstile operation;

Fig. 19 is a top plan view of a multiple magazine for tokens adapted to deliver a token of a particular form depending upon the amount of fare deposited therein;

Fig. 20 is a cross sectional view taken on the line 20—20 of Fig. 19 looking in the direction of the arrows showing the token delivering equipment as wired to deliver tokens for one of the zones;

Fig. 21 is a similar view taken on the line 21—21 of Fig. 19 looking in the direction of the arrows showing the arrangement of the elements of the device for delivering a token for another zone;

Fig. 22 is a cross-sectional view taken on the line 22—22 of Fig. 19 looking in the direction of the arrows showing the arrangement of the parts for delivering a token representing still another zone;

Figs. 20, 21 and 22 show the wiring of the multiple token magazine to be used in zone 2;

Figs. 23 and 24 represent the wiring of the separate parts of the multiple token magazine for use in zones 1 and 3 respectively. It will be noted that these two figures are more or less diagrammatic since the actual construction of the parts is the same as the construction of the device in Figs. 19, 20, 21 and 22;

Fig. 25 is a vertical cross sectional view of a modified form of token or coin controlled device for use in conjunction with the exit turnstile of zone 1.

Fig. 26 is a similar view in the modified form of the coin or token controlled device for use in conjunction with the exit turnstile of zone 2;

Fig. 27 is likewise a similar coin or token controlled device for use in connection with the exit turnstile of zone 3; and, Fig. 28 is a plan view of the arrangement of the entrance and exit barriers for a station or bus.

It will be noted that Figs. 25, 26 and 27 disclose a device which is mechanically the same in construction but which has been electrically wired in each case to provide the necessary circuits for the particular zone in which the device is used.

It has always been the desire of those interested in the construction and operation of passenger vehicle systems where the passenger himself controls his entrance and exit thereto by deposit of coins to provide more or less automatic apparatus which will permit of charging the passenger a fare approximately proportional to the length of the trip which he desires to take. It is, of course possible, by employing a suitable number of conductors or ticket takers to charge a suitable amount for the particular trip which each passenger takes as is done in the present railway systems. However, on those systems where the passenger by the deposit of his fare in suitable apparatus, as in the present subway systems, controls his admission to the restricted area of the stations, so far as I know there has never been successfully devised a system which will automatically permit the passenger to be charged an amount proportional to the length of the trip which he desires to take and still maintain the system in the form where the passenger by the deposit of the correct fare can himself control his entrance to the restricted areas of the station.

I have devised, as will appear in the following description, the necessary equipment whereby a passenger vehicle line or route may be broken up or divided into a suitable number of zones so that a passenger may be charged a fair amount approximately proportional to the length of the trip he desires to take. At the same time I have kept the system in the form where a passenger by the deposit of one or more suitable coins may himself control his entrance to and exit from the restricted areas of the platforms at the stations. For purposes of illustration I have shown the necessary equipment for a three zone system and have so arranged the parts that a passenger may enter the system at any zone and travel to any other zone of the system paying an amount, approximately proportional to the length of the trip.

As will also be apparent from the disclosure, I have constructed apparatus which is adapted for use either on subway trains, steam operated trains, street-cars, elevated lines, ferries and all similar carrier systems and at the same time I have embodied the principles of my invention in an apparatus adapted for use on road vehicles such as buses and the like.

I will describe briefly in order to give a comprehensive view of the principles of my invention, the necessary procedure which a passenger goes through in traveling on trains or buses equipped with the apparatus of my invention.

At the entrance to the platform of each station or at the door-way of a bus, I provide a token magazine which, upon the deposit of a five cent piece or similar coin will deliver to the passenger a token representing the particular zone at which the vehicle is when he boards it.

For purposes of illustration in a three zone system, I propose to use three sizes of tokens, each of a distinctive color, thus, zone 1 would be represented by a red token, zone 2 would be represented by a white token of larger size, and zone 3 would be represented by a blue token of still larger size. I do not, of course, intend to limit the token to any particular size, shape, color or material since these characteristics may be changed without departing from the principles of this invention. It may also be noted again that the particular number of zones into which a system may be divided, is not limited by the apparatus invented by me since any number of zones may be employed.

The passenger then upon depositing the coin receives a token representing the particular zone he is in and he then passes through a turnstile which is also controlled by the deposit of the coin. He is then free to board the next train, if it is in a train system, or to enter, if it is a bus or other common carrier. The token magazine and the turnstile in the case of the buses or the like, will, of course, be mounted on the carrier so that on passing through the turnstile, the passenger is free to enter. When the passenger desires to leave the train or bus, if he is in the same zone in which he entered the vehicle, he merely deposits the token in the exit device which controls the exit turnstile and passes out of the vehicle. If, however, the passenger has remained on the vehicle until it has traveled to the next zone he may leave the vehicle by depositing the token and an additional five cents, or other predetermined amount, or a token equivalent thereto. If the vehicle has passed into a third zone he may leave by depositing the token and two five cent pieces, or a ten cent piece or other predetermined amount, or one or more tokens equivalent thereto. The deposit of the token or the token and coins or predetermined combinations of them controls the operation of the exit turnstile.

I have also constructed the apparatus of my invention so that should the passenger lose his token, he can leave either the train or bus by depositing a predetermined amount in the exit device, for example, the charge could be placed at the maximum for a full trip over the whole line or at any suitable amount which may be thought desirable.

In connection with the train systems where the vehicle travels over a fixed rail route and stops at regular stations the entrance and exit devices are properly wired for the particular station at which they are disposed. On buses which employ the apparatus of my invention it will be apparent that as the bus passes from one zone to another, the token delivering device must be changed to deliver a token representing the new zone in which the bus is moving. I have devised an apparatus for accomplishing this result as will appear hereinafter.

While I have disclosed what may be termed electrical equipment for carrying out the functions of my invention, I wish it to be particularly understood that the apparatus is equally well adapted for manual, mechanical, pneumatic or electro-pneumatic operation and I do not therefore desire to be limited to electrical operation entirely, but intend that my claims shall cover manual, mechanical, penumatic and electro-pneumatic operation as well as electrical operation.

I have also devised a multiple token magazine which may be disposed at each train station or on each bus so that a passenger may, knowing the particular zone he desires to travel to, deposit an amount equal to the fare to that zone and receive a token which will permit him to leave the train or bus when he reaches that zone, without the further deposit of money coins. A multiple token magazine in that form of the invention will have as many magazines as there are zones so that by depositing the correct amount in the correct coin slot, the passenger will receive the proper token to permit his exit from a station in the zone to which he intends to travel.

Referring now to Figs. 1, 2, 3, 4, 4ª, 5 and 6, I will describe the construction of the apparatus for use on buses employing my invention. I have shown at 1, a vertically disposed shaft mounted in a suitable bracket 10 for rotation. The lower end of the shaft may be seated in a suitable base plate to permit its rotation and support. The bracket or support 10, also provides a rest on which the large spider 2 may be rotatably supported. The spider 2 encircles the shaft 1 and is provided with a casing 3, having a plurality of cup members 4 mounted thereon. Disposed above and adjacent to each of the cups is a token magazine 5 of which there will be as many as there are zones in the system. Arranged adjacent each of the magazines is a coin receiving slot 6 extending through the cover of the casing 3 and opening into the coin chutes 7. At 8 are shown the tokens in each of the magazines. As stated before, these tokens may have any number of a variety of characteristics so as to indicate the particular zone which they represent. The cylindrical portion of the spider 2 is provided with notches 9 of which there are three in the case of a three zone system. Also encircling the shaft 1 is a bracket 11 in which the shaft may rotate on which is supported a suitable electric motor 12 having a spur gear 13 keyed to the shaft. This spur gear meshes with a large gear 14, permanently secured to the cylindrical portion of the spider 2. A supporting platform 15 is secured to the upper end of the shaft 1 within the casing 3. A suitable supporting frame work 16 is secured to the member 15 and has mounted therein, an electro-magnet 17 having a core 18 adapted to slide in the frame work 16 when the magnet is energized. Mounted on the plunger or core 18 and insulated therefrom is a metallic contact member 21. Disposed on a suitable insulating supporter adjacent to the contact member 21 are two terminal studs 19 and 20 so arranged that when the magnet 17 is energized, the contact member 21 bridges the two studs 19 and 20. The construction is more clearly shown in Fig. 4ª. The end 18' of the plunger 18 is of reduced cross section and is adapted to pass into the particular token magazine in alignment therewith to eject a token from the magazine into the cup 4 when the magnet 17 is energized.

The winding of the magnet 17 is grounded at 22. Mounted on the magnet is a brush 23 adapted to provide rubbing contact with a commutator disc 24 secured to the casing 3 and insulated therefrom by means of the member 25. Pivotally mounted at 26ª, within the casing 3, is a lever 31 having pivotally mounted thereon at its upper end, a short arm 30 which projects into the coin chute 7 and has mounted thereon an electrical contact.

A similar contact is shown opposite thereto and is connected by a wire 27 to the positive terminal of a current source. The terminal on the arm 30 is electrically connected by means of the wire 29 to the commutator 24 and the brush 23 is electrically connected to the terminal stud 19. The wires 26 and 43 extending from the terminal studs 19 and 20 respectively, are connected to the entrance turnstile as will be more clearly described shortly. The lower end of the pivoted arm 31 extends adjacent to a disk 32 mounted on the plunger 18.

The bracket or frame work 35 is supported on the structure 10 and has mounted therein, another electromagnet 33 which has slidably mounted therein a plunger or core 34. The rounded end of the core adjacent the spider fits into the notch thereon and is normally held therein by a spring 36 when the magnet 33 is deenergized. The other end of the core has mounted thereon and insulated therefrom, a contact disk 37 which is adapted when the magnet is energized to bridge the terminal studs of the circuit wires 38 and 39. The wire 38 connects to the positive side of the current source and the wire 39 is connected to the electric motor 12. The other terminal of the motor 12 is grounded at 40. The electromagnet 33 has one terminal grounded at 41 and has its other terminal connected through the wire 42 to one of the stationary contacts 54 mounted inside of the drum switch 48.

Another contact 53 is mounted adjacent to the contact 54 and connected to the positive side of the current source by the wire 55. A spring switch arm 51 is mounted on the shaft 47, and is adapted to be rotated therewith. If necessary this arm may be insulated from the shaft and is adapted to bridge the contact fingers 53 and 54 and to remain thereon a predetermined length of time and then be quickly snapped therefrom by the rotation of the shaft 47.

It will be noted for a three zone system there are three sets of these contacts mounted on the drum. All this is clearly shown in Figs. 2 and 3. The drive-shaft of the vehicle is shown at 44 and is connected through a set of gears within the casing 45 to a flexible shaft 46. The shaft 46 is connected to the shaft 47 and is adapted to rotate it at a predetermined speed. The relative speed of rotation of the shaft 47, with respect to the shaft 44, will be predetermined by the sizes of the gears within the casing 45. The connection to the drive-shaft will be made on the side of the clutch opposite from the engine so that the shaft 47 will only move when the vehicle is in motion. It is even contemplated by me to drive the shaft 47 from one of the wheels of the vehicle if this is found desirable. The drum 48 is supported by the shaft 47, but is stationary. The window or opening 49 is provided in the drum and an indicator 50 is mounted on the shaft 47 to rotate with it and to be visible through the window 49. For the three zone system the indicator 50 will take the form of a cylinder having three sections of 120° extent, each section being of a different color and each color representing one of the zones, thus 50$^r$ indicates the red zone, 50$^w$ the white zone and 50$^b$ the blue zone. It is proposed to place the drum within the vehicle in such a position that it will be visible to the passengers. Thus they can see by observing the window 49 what zone the vehicle is in and when it is about to pass from one zone to another so that they may leave the vehicle if they do not wish to pay an additional fare.

Mounted within the drum 48 and on the shaft 47 is an insulating cylinder 56 having thereon the contacts 57, 58, 59, 60, 61, 62, 63, 64 and 65. These contacts are arranged on the cylinder 56 in such positions with respect to each other that they may, as the shaft 47 rotates, establish suitable connections between the spring fingers mounted on the inside of the drum 48 so that the token and/or coin controlled device for operating the exit turnstile may be adapted to be operated only by the correct token and/or fare necessary to permit the exit of the passenger depending upon how far he has taveled. As the bus proceeds from one zone to another, the drum switch 56, which rotates at a relatively slow speed, will change the connections at the spring fingers by reason of the movement of the contact pieces on the drum so that the connections to the coin and/or token operated device will be changed so that the exit turnstile can only be operated by the proper token and/or coin for that particular zone. The same movement of the drum 56 by the rotation of the shaft 47, causes the indicating device 50 to move so that the passengers can observe when the bus is about to pass from one zone to another. If desirable, it is evident that a multiple switch operated by the movement of the shaft 47 can be used to energize a signal device to call the passenger's attention to the fact that the bus is about to pass into another zone. It will be evident also that by staggering the contacts on the drum 56 with respect to each other, that the bus can travel a predetermined distance into the next zone before the indicator shows this and before the connections are changed and before the signal is operated so that passengers getting on near the end of one zone would only be required to pay a single fare if going but a short distance into the next zone.

Referring now to the connections from the drum switch to the device which controls the exit turnstile and considering Figures 2 and 5 together, it will be seen that the wires 66, 67 and 68 which are connected to fingers pressing on the contacts, 61, 64 and 65 are also connected to terminals on the coin chutes 84 and 85. The wires 69, 70, 71, 72, 73 and 74 are also connected to some of these terminals as well as terminals in the token chute 83 and to one of the terminals of the magnet 92.

Referring particularly to Fig. 5, the token and/or coin device for controlling the exit turnstile is contained within a suitable casing 80 having a slot 81 in the top thereof for receiving coins and tokens which opens into an inclined V-shaped chute 82. The construction of the coin chute 82 will be described more clearly in connection with Fig. 13. The lower end of the chute 82 opens into a vertical converging token chute 83 and is also provided with openings which deliver coins into the coin chutes 84 and 85. Pivotally mounted in a slot in the edge of these chutes 84 and 85 are non-conducting levers 86 and 88 respectively which are provided with bumps or projections 87 and 89 respectively to retain the coin in the chute when they are in their normal positions. The lever 88 is provided with several contacts all connected together by the single wire 96 which terminates at one terminal of the electro-magnet winding 92. There is a single contact on the lever 86 which is likewise connected to the same magnet terminal by the wire 97.

A similar non-conducting lever 90 is pivotally mounted in a slot in the edge of the token chute 83 and is provided with three contact terminals mounted opposite these contacts on the other edge of the chute 83 and insulated therefrom are three other terminal contacts which are all electrically connected together and to a wire 94 leading to the positive terminal of the power source. The uppermost contact at the left of the coin chute 85 is connected by the wire 95 to the positive terminal of the current source. The next terminal below this connects to the wire 68 and the lowermost terminal at the left is connected to the wires 66 and 67. The single contact at the left of chute 84 is connected by the wire 98 to the wire 68. The remaining terminal of the magnet 92 is grounded at 99.

The levers 86, 88 and 90 are pivotally connected to a rod 91 operated by the plunger of the electromagnetic solenoid 92 and is maintained in such a position by the spring 93 as to hold these levers in their normal position in the slots of the chutes as shown in this figure. A single wire 100 leads from the upper terminal of the magnet 92 to the coil of the exit turnstile which releases it for operation as will be described hereinafter.

In Fig. 6 is shown the construction of the magnet and mounting for operating the holding dog on the multiple token magazine shown in Fig. 2. The construction comprises a suitable frame work 35 mounted on the support 10 in which is secured the solenoid winding 33 having a fixed internal pole piece 34' which is centrally bored. The sliding plunger or armature 34 is attracted by the pole 34' when the winding 33 is energized. An extension of the plunger 34 passes through the pole pieces 34' as shown at 34'''. A collar 34ᵃ is secured to the extension 34''' and serves to compress the spring 34'' when the plunger 34 moves to the right. As soon as the magnet 33 is deenergized, the spring 34'' returns the plunger to its normal position at the left. This description of the magnet 33 will be sufficient for the magnets 17, 92, 109, 149, 169, 189, 211, 236, 260, 280, 304, 315, 325, 344, 357, 371, 408, 424, and 443. The construction of all these magnets is substantially the same and any slight variations will be pointed out in connection with the particular magnets.

This completes the description of the equipment necessary for operating buses in accordance with the principles of my invention with the exception of the association of the exit turnstile with the equipment which will be described later.

I consider it within the scope of my invention to manually collect the tokens at the exit point and manually receive the appropriate additional fare due, if any, as indicated by a physical characteristic of the token such as size, shape, color, and so forth. This is especially true where my invention is applied to buses, street cars and other transportation systems where an attendant is present, as for instance the bus driver, car conductor, or motorman.

The exit turnstile for the bus and railway systems is the same. The operation of this equipment will be described later.

Referring to Figs. 7 to 18, which disclosed the equipment necessary to apply my invention to railroad lines, subway lines, street-car lines, elevated lines and the like and particularly to Fig. 7, there is shown at 101, the casing containing the coin operated token delivering device and the mechanism for controlling the entrance turnstile. It may be pointed out here that as is presently employed in the modern subway systems, it is contemplated that the stations will be closed off to provide restricted areas. Separate entrance and exit ways will be provided for the stations having entrance and exit turnstiles mounted therein and controlled by the coin operated entrance device shown generally at 101 and the various coin and/or token operated device for controlling the exit turnstiles as shown generally at 140, 160 and 180. Within the casing 101 is mounted a coin chute 102 into which coins or tokens may be deposited through a slot at the top of the casing. A lever 104 is pivotally mounted on a bracket at 105 and has a pivoted insulating arm 103 mounted on its upper end which projects into the chute as shown at Fig. 7. The lower end of the lever 104 is pivoted at 106 to the slidable rod 107. Mounted on the rod 107 is a plunger 108 which slides within the solenoid winding 109 and is adapted to be attracted by the pole piece 109' when the winding is energized. Mounted towards the left on rod 107 and insulated therefrom is a metallic contact member 110, which is adapted to close a circuit connected to the terminal studs 111 and 112 when the magnet is energized. The springs 113 are adapted to maintain the contact member 110 in the position shown in the drawings when the magnet is deenergized as well as maintaining the short arm 103 in the chute passage-way. At the extreme right end of the rod 107 is a reduced portion 114 which passes into the token magazine 116 when the magnet is energized to eject one of the tokens 115 into a cup 117 from which it may be taken by the passenger who deposits a coin in the coin chute. One terminal of the magnet 109 is grounded at 118 and the other terminal is connected by the wire 119 to one terminal of the magnet 128 in the entrance turnstile. A jumper connection 120 electrically joins the wire 119 with the terminal 118. The other terminal 112 is connected by the wire 121 to a spring finger 122 in the exit turnstile. A similar finger 123 is connected by the wire 124 to the positive terminal of the current source. The wire 119 is also connected by the wire 125 to a contact terminal on the short insulating arm 103. Mounted opposite this terminal in the coin chute and insulated therefrom is another terminal which is connected by the wire 126 to the positive side of the current source. The other terminal of the magnet 128 is grounded at 127. The plunger 129 is slidably mounted in the bracket supporting the winding 128 and is adapted to project into sockets or recesses 136 in the face of the ratchet 135 when the magnet is deenergized. The ratchet wheel 135 is rigidly secured to the vertical rotatable shaft 130 mounted within the turnstile casing 131. The upper end of the shaft 130 which projects through the casing 131 is provided with four barrier arms placed at right angles to each other in the usual and well-known manner as appears from Fig. 16. An insulating disk 133 is mounted on the shaft 130 to rotate with it and is provided with four contacts 134 of sufficient extent to provide a holding circuit for the magnet 109 after the coin has passed down the chute 102 which maintains this circuit until the passenger has operated the turnstile by passing therethrough. By keeping the magnet 109 energized, the circuit to the magnet 128 remains energized through the disk 110 so that the turnstile is free to be rotated. As soon as the contact plate 134 is moved out from under the fingers 122 and 123, magnets 109 and 128 are deenergized so that the plunger 129 will drop into the next recess 136 to prevent another passenger from passing through the turnstile without depositing a coin.

The construction of the switch 133 is clearly shown in Fig. 9.

Referring to Fig. 8, it will be evident that the pawl 137 is resiliently held against the ratchet teeth by the spring 138 so that the turnstile is only free to move in one direction, that is, the entrance direction when a coin has been deposited. The operation of this equipment will be described hereinafter.

Referring now to Fig. 10, wherein is shown the device for operating the exit turnstile in zone 1, there is shown generally at 140, the casing for this mechanism. It may be pointed out in connection with this figure and Figs. 11 and 12, that the general construction of the apparatus is the same but that the important difference lies in the wiring connections so that the exit turnstiles for each zone can only be operated by the suitable token and/or coins.

Within the casing 140 is an inclined chute 141 into which the coins and/or token may be deposited through a slot in the casing. The coin chutes 142 and 143 are connected to the chute 141 and at the lower end of the chute 141 is a vertical converging token chute 144. Pivotally mounted in a slot in the edge of chute 144 is a non-conducting lever 145 having three contacts on the edge thereof. Similar levers 146 and 147 are pivotally mounted in slots in the chutes 143 and 142, respectively, and have contacts thereon as shown and depressions to retain the first coin. These three levers are pivotally connected to the slidable rod 148 which gets its movement from the solenoid winding 149. All the contacts at the left edge of the chute 144 are electrically connected together and connected by the positive side of the current source by the wire 150. One terminal of the winding 149 is grounded at 151 and a wire 152 leads from the other terminal to the magnet 211 on the exit turnstile, (Fig. 14) as will be described.

The wire 153 leads from the same terminal as wire 152 to the right hand contact in chute 142 and a wire 154 leads from the corresponding terminal at the other side of the chute to the uppermost terminal at the right side of chute 144. A jumper wire 155 connects the wire 154 with the left central terminal chute 143. The upper left terminal of this chute is connected to the positive side of the current source by the wire 156 and the lower terminal of this chute is connected by the wire 157 to the central terminal at the right hand edge of chute 144. The lower terminal of this chute is connected by the wire 158 to the wire 159 and to the upper terminal of the winding 149.

The token and/or coin operated device for controlling the exit turnstiles of zone 2 is shown in Fig. 11. This equipment is mounted within the casing 160 having the chute 161 and the branch chutes 162, 163 and 164 in which are pivotally mounted as before, the levers 165, 166 and 167 respectively. These levers are pivotally connected to the slidable rod 168 operated by the solenoid winding 169 which is grounded at 170. The wire 171 connected to the upper terminal of this winding goes to one terminal of the magnet 211 of the exit turnstile. As before, all the contacts at the left edge of the chute 164 are connected together and to the positive side of the current source by the wire 172. The upper and lower contacts at the right hand edge of the chute 164 are connected by the wire 173 to the lower left hand contact in chute 163. The central contact at the left of the chute is connected by the wire 174 to the positive side of the current source. The central contact at the right of chute 164 is connected by the wire 175 to the two lower contacts at the right edge of chute 163 and also connected by the wire 176 to the upper terminal of the magnet 169. This terminal is also connected by the wire 177 to the right hand contact of chute 162 and the co-operating contact at the left of chute 162 is connected by the wire 178 to the positive side of the current source.

It will be noted that the two uppermost contacts of chute 163 are not utilized in zone 2.

The coin and/or token operated exit device for zone 3 is shown in Fig. 12 and comprises the casing 180 having the internal inclined chute 181 and the branch chutes 182, 183 and 184 having as before the pivoted levers 185, 186 and 187 in slots in the edge of the chutes. These levers are all pivotally connected to the sliding rod 188 which is moved by the magnet 189. One terminal of the magnet 189 is grounded at 190 and the other terminal is connected by wire 191 to the magnet 211 of the exit turnstiles of zone 3. It may be pointed out here for the sake of clarity that the exit turnstiles are all structurally the same for each station in each zone and therefore, the magnet 211 will be the same in each turnstile and connected to a similar terminal of the coin and/or token operated device. Here again all the contacts at the left of chute 184 are electrically connected together and to the positive terminal of the current source by the wire 192. All the contacts at the right edge of chute 183 are electrically connected by the wire 198 to the wire 193 which is connected to the upper terminal of the magnet 189 and by wire 197 to the wire 191 on the right hand contact in chute 182, which wire 193 also connects to the upper right hand contact in chute 184. The central contact at the right hand edge of this chute connects by wire 195 to the lower left hand contact of chute 183. The lower right hand contact of chute 184 is joined by the wire 194 to the central left contact of chute 183 by the wire 196 and also connects to the left hand contact of chute 182. The upper left hand contact of chute 183 is connected by the wire 196' to the positive side of the current source.

The construction of the chute 181, which is the same for all the exit devices so far described, is more clearly shown in Fig. 13. This comprises a V-shaped channel having the openings 181'' and 181' which are enclosed by the sides of the chute 183 and 182. The opening 181'' is of sufficient size to let a ten cent piece pass therethrough and the opening 181' is of sufficient size to permit a five cent piece to pass through. These openings appear on both sides of the channel and are of sufficient length for the particular inclination of the chute 181 to prevent the coins from passing thereby and not entering the correct chute. The lower end of the chute 181 is cut away to permit a token to fall into the chute 184. A coin is shown at 183' in Fig. 13. I have so designed these chutes that no matter how rapidly the coins are dropped into chute 181, they automatically pass through the correct opening and into the correct chute.

While the exit turnstiles are of approximately the same construction as the entrance turnstiles, a complete description will be given in connection with Figs. 14 to 18 in order to make a complete disclosure. The turnstile casing is shown at 200 having the vertical, rotatable shaft 201 with the barrier arms 202 mounted thereon in the form of a cross. An insulating drum 203 is mounted on the shaft 204 and has four contacts 206 mounted on the periphery to close a circuit connected to the two spring fingers 204 and 205. Near the lower end of the shaft 201 is keyed the ratchet wheel 207 having four recesses 208 on its face. The pawl 209 pivotally mounted on the casing 200 is resiliently pressed against the ratchet 207 by the spring 210. This permits rotation of the barrier arms in a counter clockwise direction (see Fig. 17) when a coin is deposited, but prevents its rotation in the clockwise direction. The magnet winding 211 is mounted within the casing 200 and has the slidable core 212 adapted to seat in the recesses 208 on the ratchet 207. When the magnet 211 is deenergized, the spring 218 forces the plunger 212 against the face of the ratchet wheel 207 so that it will drop into one of the recesses 208 when they become aligned. The winding 211 is grounded at 213 and is connected by the wire 214 to a terminal stud 215. A juxtaopposed terminal 216 is connected by the wire 205' to the spring finger 205. The spring finger 204 is connected to the positive side of the current source by the wire 204'. Mounted on the upper end of the plunger 212 and insulated therefrom is a metallic contact member 217 which closes the circuit between the terminals 215 and 216 when the magnet is energized. A circuit connection is made from the wire 214 to either of the wires 100, 152, 171 and 191 depending upon the particular zone it is in. (See Figs. 5, 10, 11 and 12.)

Figs. 15, 16, 17 and 18 more clearly disclose the construction of the turnstile in Fig. 14.

As will be apparent from the foregoing description of the apparatus to be used in connection with steam and electric lines, the turnstile control and token delivering device must be provided at each entrance of each zone. It will be apparent that the passenger may only deposit the initial fare in the device and receive a token which will permit his exit from any other station in the same zone. If he should desire to travel to some other zone it will be necessary to deposit the token and such other coins or tokens as required to permit his exit. I have therefore devised a token delivering and turnstile controlling device which can be of uniform construction for all of the entrance ways of all the stations. This device I will call a multiple magazine token device. The one difference which these devices for each zone has, is the arrangement of the electrical connections.

The novel feature about this structure is that it is arranged so that a passenger desiring to enter on to the platform of any station of any zone intending to travel to a station in some other zone or the same zone may deposit in the proper slot the correct amount to secure him a single token which will permit him to make his exit from a station in the particular zone to which he intends to travel. In other words, by depositing the correct fare to the particular zone to which he desires to travel, he will receive a token which will permit his exit from any station of that zone without the further deposit of any coins. It, of course, is evident as will be more fully described later, that the circuit connections for the token operated devices which control the exit turnstiles while of uniform construction must each be wired so that it will only be caused to operate when the correct token for that zone is deposited. The exit devices are also arranged so that the passenger may, as he does in connection with the previously described equipment, deposit a token and/or coin to make his exit. If he has secured an exit token for one zone but while still on the vehicle decides to travel further than he originally intended, he can travel to that zone and deposit the token which he has plus the necessary coins or tokens and still make his exit. It will be evident that this construction which is about to be described in detail is very flexible since the passenger may deposit a single coin and get his exit token which will let him out of any station of any zone, either alone or with the deposit of the necessary coins or he may on entering the system, deposit the necessary fare to carry him to the particular zone he intends to travel and receive a token which will permit his exit without the deposit of any further coins.

Referring to Fig. 19 in which is disclosed a multiple token magazine, there is shown a suitable casing 220 having the three token receiving cups 221, 222 and 223. The device is shown with three magazines and cups since, as I stated before, I am illustrating the principles of my invention in connection with a three zone system but it will be apparent that there will be as many magazines and cups as there are zones to the system. The coin receiving slots are shown at 224, 225 and 226 and the magazine for each slot is shown at 227, 228 and 229, respectively.

Referring now to Figs. 20, 21 and 22 for a description of the parts of the device within the casing there is shown in Fig. 20, the equipment used in connection with the first magazine. Thus, if the device was placed at an entrance to a station in zone 1, the deposit of a coin in the slot 224, would deliver a token from the magazine 227 which would permit the exit of the passenger from any other station of that zone.

Referring to Fig. 20, the apparatus to effect this operation is shown within the casing 220 which has the coin receiving slot 224 opening into an inclined coin chute 230, having the branch coin chutes 231 and 232. Pivotally mounted in a slot in these chutes are the insulating levers 233 and 234 respectively, which are pivotally connected to the slidable plunger or rod 235. The movement of this rod is effected by means of the solenoid winding 236 which is grounded at one terminal, by the wire 237 and which is connected at the other terminal by a wire 238 to the wire 240.

This wire 240 extends to one terminal of the coil 128 of the entrance turnstile (see Fig. 7). This wire 238 is also connected by the wire 245 to a terminal stud 243. The wire 239 which extends from the spring finger 122 of the entrance turnstile is connected by means of the wire 241 to another terminal stud 242. When the magnet is energized the contact 244, mounted on the rod 235 and insulated therefrom, closes the circuit between these terminal studs. This movement of the plunger also causes the reduced end 249 of the plunger to eject a token 250 from the magazine into the cup. The wire 246 is connected to a contact terminal on the lever 233 and is also connected to the upper contact terminal on the lever 234. The other contact terminal of chute 231 is connected by the wire 247 to the upper right hand terminal of the chute 232 and the two are joined to the wire 248 which extends to the positive side of the current source.

Figs. 21 and 22 show the operating equipment used in connection with magazines 228 and 229. The coin slot 225 opens into the inclined chute 251 which has the branch chutes 252 and 253. Pivotally mounted in these chutes 252 and 253 respectively, are the levers 254 and 255, which are pivotally connected to the slidable plunger 256. This plunger is caused to move by means of the solenoid winding 260, which has one terminal grounded at 261 and its other terminal connected by the wire 262 to the conductor 240. The rod 256 has a reduced portion 264 for ejecting a token into the cup 222 and has mounted on its other end the contact member 257 and insulated therefrom for closing the circuit between the terminal studs 258 and 259. The terminal stud 258 is connected by the wire 263 to the conductor 239 and terminal stud 259 is connected by the wire 259' to the conductor 262 which also connects with the lower left hand terminal contact of chute 253. The corresponding contact on chute 253 is connected to the conductor 248.

The operating equipment in connection with magazine 229 includes the coin receiving slot 226 which delivers into the inclined chute 270 having the branch chutes 271 and 272. Pivotally mounted in the sides of chutes 271 and 272 respectively, are the levers 273 and 274 which are in turn pivotally connected to the slidable rod 275. The solenoid winding 280 which operates the rod 275 has one terminal grounded at 281 and the other terminal connected by wire 282 to the conductor 262 which is connected with the conductor 240. The wire 263 from conductor 239 is secured to the terminal stud 278 and terminal stud 277 is connected by wire 279 to the conductor 262, which is also connected to the upper left hand terminal of chute 272. The corresponding terminal at the right of chute 272 connects to the conductor 248. The wire 284 connects the conductor 262 to the left hand contact of chute 271 and wire 284' connects the other contact of chute 271 to the conductor 248.

The magazine token delivering device described in Figs. 19, 20, 21 and 22 is shown with its parts connected together to provide the proper operation for the device when placed in zone 2 of the three zone system which I have been describing as illustrative of the principles of my invention.

Referring to Fig. 23, the electrical connections for a multiple magazine token delivering device for zone 1 are shown. The casing and other incidental equipment such as the magazine, etc., have not been shown in this figure since they will be exactly the same as the equipment described for zone 2. However, Fig. 23 does disclose the electrical connections which will now be described in detail.

The conductor 300 is connected by means of the wire 302 to the terminal stud 302'. The conductor 301 is connected by means of the wire 303 to one terminal of the magnet 304, to the terminal stud 303' by means of the wire 309 and to the left hand contact of the lever 311 which is mounted as described before in a coin chute. The other terminal of the magnet 304 is grounded at 305. The lever 310 is pivoted in the other coin chute and it will be noted that there are no connections to the terminal on the lever 310, and the opposite terminal on the coin chute. The levers 310 and 311 are pivotally connected to the slidable plunger rod 306 which is adapted to be moved longitudinally to the left when the magnet 304 is energized. As before, the reduced portion 307 at the left of the plunger is adapted to eject a token from the magazine as previously described. A metallic bridging member 308 is mounted on the plunger 306 and insulated therefrom and is adapted upon movement of the plunger to close the circuit between the terminals 302' and 303'. The right hand terminal of the right hand chute is connected to the wire 312, which leads to the positive terminal of the current source. The wire 313 leading from the wire 300, connects to the terminal stud 313' and the wire 314 connects the wire 301 to one terminal of the magnet 315, and the left hand contact on lever 318 by means of wire 322', the terminal stud 321' by means of the wire 321 and the upper left hand contact on lever 319. The winding 315 is grounded at 316. The slidable plunger 320, as before, is pivotally connected to the levers 318 and 319 and has the reduced portion 317 for ejecting the token. The right hand terminal of the left hand chute is connected by the wire 319' to the wire 312. The wire 312 is also connected to the right hand terminal of the right hand chute. The wire 323 connects the wire 300 to the terminal stud 323' and the wire 324 connects the wire 301 to one terminal of the winding 325, to the contact on lever 327 by means of wire 332 to terminal stud 331' by means of wire 331 and to the upper contact on the lever 328. The winding 325 is grounded at 326. The right hand contact on the left hand chute is connected by the wire 333 to the lower contact of lever 328. The two right hand contacts of the right hand chute are connected to the wire 312. Here again, the levers 327 and 328 are pivotally connected to the plunger 329 which has the reduced token ejecting portion 338. The plungers 320 and 329 have mounted thereon, and insulated therefrom, the contact members 322 and 330 respectively. The wire 300 is connected to the contact finger on the turnstile as described before and the wire 301 connects to one terminal of the winding which releases the turnstile for entrance operation.

Fig. 24 discloses the electrical connections for a multiple magazine device for zone 3. The wire 340 is connected by means of wire 342 to the terminal stud 342' and the wire 341 is connected by means of wire 343 to one terminal of the winding 344, to the contact on lever 346 by means of wire 352, to the terminal stud 341' by means of wire 351 and to the upper contact on lever 347. The winding 344 is grounded at 345. The right hand contact of the left hand chute is connected by wire 353 to the lower contact on lever 347. The two right hand contacts of the right hand chute are connected to the positive side of the current source by means of wire 354. The levers 346 and 347 are pivotally connected to the plunger 348 which has a reduced token ejecting portion 349 and has mounted thereon and insulated therefrom the contact member 350. Wire 340 is connected through the wire 355 to terminal stud 355' and wire 341 is connected through the wire 356 to the winding 357, to the terminal stud 363' by wire 363, to the contact on the lever 359 by wire 366 and to the upper contact on lever 360. Winding 357 is grounded at 358. The right hand terminal of the left hand chute is connected by wire 364 to wire 354 and the right hand terminal of the right hand chute is connected to the wire 354. The levers 359 and 360 are pivotally connected to the plunger 361 which has the reduced token ejecting portion 365 and has mounted thereon and insulated therefrom the contact member 362. Wire 340 is connected by the wire 369 to the terminal stud 369' and wire 341 is connected by the wire 370 to one terminal of the winding 371, to the terminal stud 378' by wire 378 and to the lower contact on lever 374. The other terminal of the winding 371 is grounded at 372. The lower right hand terminal of the right hand chute is connected to the wire 354. The levers 373 and 374 are pivotally connected to the plunger 375 which has the reduced token ejecting portions 377 and has mounted thereon and insulated therefrom the contact member 376.

As before, the wire 340 goes to the contact finger on the entrance turnstile and the wire 341 is connected to the winding which releases the turnstile for entrance operation.

It may be stated briefly in connection with Figs. 19 to 24 inclusive, that the multiple token magazine for each zone is connected to its own entrance turnstile for operation as will be described later. The wire connections for the device for each zone are arranged so that upon the deposit of a single coin, a token will be delivered representing the particular zone in which the fare is deposited in the device or by the deposit of the correct amount, receive a token for traveling to any other zone, which token will permit the operation of the exit turnstile of any station in that zone without the further deposit of any coins.

Figs. 25, 26 and 27 disclose a modified form of token and/or coin operated device for controlling the exit turnstiles for zones 1, 2 and 3 respectively.

Referring particularly to Fig. 25, the parts of the device are disclosed as mounted within a casing 400 having the token receiving slot 401 and the coin receiving slot 402. The slot 402 opens into an approximately vertical coin chute 403 having pivotally mounted in a slot in the chute the lever 404. The token slot 401 opens into a vertical converging token chute 406 having pivotally mounted in a slot in the chute the lever 405. The levers 404 and 405 are pivotally connected to a slidable rod 407 which is moved to the right against the action of a spring when the winding 408 is energized. The winding 408 is grounded at 409. All the contacts at the left of chute 406 are electrically connected together and to the positive side of the current source by means of the wire 410. The upper contact on the lever 405 is connected by the wire 411 to the second from top contact at the left of chute 403 and is also connected by the wire 414 to the lower contact at the left of the chute. The uppermost contact at the left of the chute is connected by means of the wire 415 to the positive side of the current source. The middle contact on lever 405 is connected by means of the wire 412 to the third contact from the top at the left of chute 403. The lowermost contact on lever 405 is connected by wire 413 to the other terminal of the winding 408 and also to all of the contacts on lever 404. The wire 415′ is connected to the coil which releases the exit turnstile for exit operation as for instance the coil 211 of the turnstile in Fig. 14. The levers 404 and 405 are pivotally connected to the slidable rod 407, which moves to the right when the winding 408 is energized.

The modified exit equipment for zone 2 is shown in Fig. 26. The parts are mounted in a suitable casing 416 having the slots 417 and 418 which open into the chutes 419 and 421 respectively. The levers 420 and 422 are pivotally mounted in the chutes 419 and 421 respectively and are pivotally connected to the slidable rod 423. This rod is moved to the right against the action of the spring when the winding 424 is energized. One terminal of this winding is grounded at 425. All the contacts at the left of chute 421 are connected together and to the positive side of the current source by means of wire 426. The upper contact on lever 422 is connected by the wire 427 to the third contact from the top at the left of the chute 419 which in turn is connected by the wire 428 to the lower contact on the lever 422.

The central contact on lever 422 is connected to the other terminal of the winding 424 and also by means of wire 429 to the wire 430 which connects in turn the three lower contacts on the lever 420 to the releasing coil of the exit turnstile. The second terminal from the top at the left and the lower terminal at the left are connected together and to the positive side of the current source by the wire 431. There are no connections to the upper set of contacts on the chute 419.

In Fig. 27 is shown the token and/or coin operated device for controlling the exit turnstile of zone 3. A suitable casing is shown at 435 having the slots 436 and 437 opening into the chutes 438 and 440 respectively. The levers 439 and 441 are shown pivotally supported in slots in the chutes 438 and 440 respectively and which are pivotally attached to the slidable rod 442. As before, the winding 443 is grounded at 444. All the contacts at the left of chute 440 are connected together and to the positive side of the current source by wire 450. The upper contact on lever 441 is connected by means of wire 445 to the other terminal of the winding 443 and is also connected by the wire 448 to all the contacts on lever 439. The middle contact of lever 441 is connected by the wire 447 to the third from the top contact on the chute 438. The lower contact on lever 441 is connected by the wire 446 to the second contact from the top at the left of chute 438 and by wire 449 to the lower contact at the left of the chute. The upper contact at the left of the chute is connected by the wire 452 to the positive side of the current source. All the contacts on the lever 439 are connected by the wire 453 to the releasing coil of the exit turnstile for zone 3.

I have now described in considerable detail, all of the various devices which are used in applying the principles of my invention to buses and all forms of railway systems and to provide a practically automatic zoning arrangement for such systems.

I will now describe the operation of these devices as applied to such systems. As I have stated before, the necessary equipment for a transportation line divided into three zones has been described and the operation of such three zone systems will now be discussed.

Referring first to Figs. 1 to 6 inclusive which relate to apparatus for dividing a bus route into zones, I will describe the operation of this apparatus. I will assume for purposes of description that the arrangement of the apparatus in these figures is such as it would be when the bus is in zone 1. The cup 4 and its associated magazine 5 will then be disposed adjacent the entrance passage-way of the bus in which an entrance turnstile of the type shown in Fig. 7 is disposed. The passenger then desiring to get on the bus will deposit a coin in the slot 6 which will cause the following operations:

Referring to Fig. 2 the coin 28 closes the circuit from the positive side of the current source through the wire 27, wire 29, commutator disc 24, brush 23 through the winding 17 and to ground at 22 which completes the circuit to the negative side of the current source which is grounded. This energizes the solenoid 17, forcing the lever 18 to the left to close the circuit connected to the wires 26 and 43 through the terminal studs 19 and 20 and the contact member 21. The same movement of the rod 18 carries the member 32 to the left causing the lever 31 to withdraw the short arm 30 from the chute 7 to release the coin into a suitable coin retaining compartment. The reduced portion 18′ of the lever 18 also forces a token into the cup 4 from whence it is taken by the passenger. As stated before, a turnstile of the type shown in Fig. 7 is associated with the entrance way of the bus and the winding 128 thereof is connected to the wire 26 while the other terminal is grounded as at 127. The wire 43 will be connected to one of the spring fingers 122 while the other spring finger is connected to the positive side of the current source. These two fingers 122 and 123, provide a holding circuit for the winding 128 and the winding 17 when the coin 28 is released causing the circuit for the winding 17 through this coin to be broken. This holding circuit is maintained as follows:

The current passes from the positive side of the current source through the wire 124, finger 123, contact 134, finger 122, wire 121 to wire 26, terminal stud 19, contact member 21, terminal stud 20, wire 43, to one terminal of the winding 128. The current also passes from the terminal stud 19 through winding 17 to ground. The other terminal of the winding 128 is also grounded. Thus, it will be seen that as long as the contact 134 bridges the two spring fingers, the windings 17 and 128 will be energized even though the coin 28 has passed into its retaining compartment. The energization of the winding 128 raises the plunger 129 and holds it there until the turnstile has been moved a sufficient distance to move the contact 134 out of alignment with the spring fingers. When this occurs the holding circuit is broken and the windings 17 and 128 deenergized. As a result, the plunger 18 returns to the right and plunger 129 drops down against the face of ratchet wheel 135. The passenger moves on through the turnstile causing it to make a one-quarter revolution until one of the recesses 136 becomes aligned with the plunger 129 when it drops therein to prevent further rotation of the turnstile. As a result of these operations the passenger has received a token representing the particular zone which he is in and has passed through the turnstile into the bus where he may take a seat. It may be pointed out here that this token will permit his exit from the bus if it is still in the same zone without the further deposit of any coins but if he is in some other zone in order to make his exit from the bus, he must deposit this token plus the correct amount in coins.

I wish to point out in this connection that I have not shown in Fig. 2 the entrance turnstile connected to the token delivering device since this does not seem necessary. The entrance turnstile or barrier of Fig. 7 clearly discloses the construction of the barrier which will be used in connection with the token delivering device shown in Fig. 2. I have described the connections of this turnstile to the device and this is sufficient for illustrative purposes. I also call attention to the fact that it is not necessary to use a turnstile barrier in connection with the token delivering device on a bus since it may be arranged to operate any other type of barrier such as a gate or doors.

When the passenger decides to leave the bus if he is in the same zone in which he entered the bus, he will proceed to the exit way and deposit his token in slot 81 of the device which controls the exit turnstile. This token will fall through chute 82 into chute 83 and will stop at the lowermost set of contacts. Attention is called to the fact that we have started this description of the operation by assuming that the passenger has entered the bus in zone 1. The token which he receives as representing zone 1 is the smallest in size and may be characterized by a suitable color such as red, if desired. When this token bridges the lowermost contacts, the current flows from the positive side of the current source through the wire 94, through the token to the wire 69 and thence through contact 57 on drum switch 56 to wire 72, and then through the coil 92 to ground at 99. This energizes the solenoid 92 and draws the plunger 91 to the right to release the token into a suitable receiving compartment. The current also passes through wire 100 to one terminal of the winding 211 of the exit turnstile such as shown in Fig. 14. The current passes through this winding to the ground at 213. The energization of this coil 211 raises the plunger 212, causing it to close a holding circuit at the terminal studs 215 and 216. The current then travels from the positive side of the current source through the wire 204' to spring finger 204, contact 206, spring finger 205, wire 205', contact 216, contact member 217, contact 215, wire 214 and thence through the coil 211 to ground at 213. Thus, after the token has left the lower contacts in the chute 83, the coil 211 remains energized until the contact 206 passes out from under the fingers 204 and 205. This occurs as the passenger makes his exit through the restricted passage-way rotating the turnstile 202 and one-quarter turn. As soon as the coil 211 is deenergized by this movement of the turnstile the plunger 212 drops down and falls into the recess 208 when it comes in alignment therewith thus checking the movement of the turnstile.

As the bus travels through zone 1, the shaft 47 rotates slowly and when the limit of zone 1 is reached, the spring switch 51 closes the circuit between the contacts 53 and 54 so that current flows from the positive side of the current source through the wire 55, contact 53, switch-arm 51, contact 54, wire 42 and thence through the winding 33 to ground at 41. The plunger 34 moves to the right releasing the spindle 2. By this movement, the circuit to the motor 12 is closed as follows: The current flows from the positive side of the current source through wire 38, switch-member 37, wire 39 and thence through the motor to ground at 40. This energizes the motor and causes the magazine casing mounted on the spindle 2 to be rotated through the gears 13 and 14. This continues until the circuit is broken by the passage of the switch 51 from the contacts 53 and 54 when the coil is deenergized and the spring 36 returns the plunger 34 to its normal position to engage the next notch 9 on the spindle 2. The casing 3 is, then, rotated so as to place the token magazine holding tokens representing the second zone adjacent the restricted entrance-way. A passenger entering the bus in this zone deposits a coin and secures a token representing the second zone; the operation of the circuits in this case being the same as described in connection with the operation in zone 1. The same movement of the shaft 47 has changed the connections at the spring fingers by moving a new set of contacts thereunder. If the passenger who entered the bus in zone 2 desires to leave the bus while in that zone, he deposits the token in slot 81 (see Fig. 5) and this token will rest at the central set of contacts to again energize the magnet 92 and release the exit turnstile in a manner similar to that previously described. If a passenger who entered the bus in zone 1 desires to leave the bus in zone 2, he will deposit his token in the slot 81 and a five cent piece or other coin. This token will, since it is the smallest, stop at the lowest set of contacts and complete the circuit from wire 49 to wire 69 and thence through the spring fingers and contacts 64 to the wire 67 and to the coin in chute 85, whence the current will travel thereunder to wire 96 and finally through the coil 92 to ground at 99. The device 80 operates as before and the current travels through wire 100 to the exit turnstile as described. When the bus travels into the third zone, another pair of contacts 53 and 54 (see Fig. 3) are bridged by the switch-arm 51 and the casing will rotate as described before to place the third token magazine adjacent the restricted entrance-way. At the same time, the third set of contacts on the drum switch 56 are brought in alignment with the spring fingers. A passenger entering the bus in this zone deposits his coin and gets the largest size token representing this zone. When he desires to leave the bus, he deposits this token in slot 81 which bridges the upper set of contacts in chute 83 to close the circuit from wire 94 to 71 and thence through the spring fingers and contact 59 to wire 70. The current then travels from wire 70 through the coil 92 to ground at 99 to cause the device to operate as before. The current also travels through wire 100 to the exit turnstile as previously described. If a passenger who has entered the bus in zone 1 desires to leave it in zone 3, he deposits his token and two coins in slot 81 to complete the circuits as follows: The current flows through the wire 94, through the lower set of contacts in chute 83 which are bridged by the token representing zone 1 and thence to the wire 69 and through the spring finger connected thereto to the contact 62, through the spring finger connected to wire 68 to the left hand middle contact of chute 85, through wire 96 to the coil 92 and then to ground at 99. The current also travels through wire 100 to the exit turnstile as described before. It is of course to be noted that the drum switch 56 has moved over so that the third set of contacts, 59, 60 and 62 are under the spring fingers. If the passenger instead of depositing two five cent pieces in the chute 85, deposits a ten cent piece in the chute 84, the current will travel as before to wire 68 and thence through wire 98, the ten cent piece, wire 97 and through the coil 92 to ground at 99. Thus, the passenger who entered the bus in zone 1 may depart from it in zone 3 by depositing a token and two five cent pieces, or a token and a single ten cent piece. If a passenger who has entered the bus while it was in zone 2 desires to leave the bus when it is in zone 3, he deposits the token, which he received, in the slot 81 from which it travels to the middle set of contacts in the chute 83. The current then travels from the wire 94 through the token to wire 73, to its connected spring finger, through contact 60, through the spring finger connected to the wire 66 and through the wire 66 to a single coin in chute 85, through the coin to wire 96 and thence through the coil to ground at 99. Should the passenger for any reason misplace or lose the token which he receives on entering the bus, he may make his exit from the bus at any point in the system by depositing three five cent pieces in the coin chute 85. The current will then travel through wire 95, the uppermost coin, wire 96, coil 92 and finally to ground at 99.

From the previous description it will be apparent that I have described a three zone system where five cents is charged for the privilege of traveling in each of the zones so that a passenger may make a complete trip over the system for fifteen cents. These values are however arbitrarily taken since it is evident that the amount of such fares will depend upon the number and length of zones in the system. It will be evident that if it is desired to charge less than five cents for each particular zone in which the passenger travels, for instance three cents, that tokens of suitable size may be sold for three cents which would operate the device as previously described. It will be evident then that I do not desire to be limited to the operation of my device by tokens and money since the whole apparatus may be controlled by suitable tokens which can be sold for any prearranged amount.

Referring to Fig. 7 which discloses the token delivering device and the manner in which it co-operates with the entrance turnstile for systems such as railways, subways, elevated lines and street-cars, there is disclosed a very simple form of coin controlled token delivering device. The construction of these devices for each zone will be exactly the same with the single exception that the token magazine will be of different sizes. A passenger desiring to enter the restricted area of the station platform or car platform will deposit a five cent piece in the coin slot 102' where it will be retained by the arm 103 and close a circuit from the positive side of the current source through wire 126 to the coin, through wire 125, wire 119 and coil 109 to ground at 118. This energizes the solenoid 109 and draws the armature 108 to the right causing a token to be ejected from the magazine into the cup 117. This movement of the armature and its attached rod 107 also releases the coin so that it may fall down through the chute 102 into suitable receptacle and at the same time closes the circuit connected to the terminal studs 111 and 112 by means of the contact member 110. The current then flows from the positive sides of the current source through wire 124, spring finger 123, contact 134, spring finger 122, wire 121, contact member 110, wire 120 and through coil 109 to ground at 118. This provides a holding circuit for the solenoid 109. At the same time that the coin completed the circuit for the solenoid 109, the current traveled from wire 125 to one terminal of the solenoid 128 to ground at 127. This raises the plunger 129 to release the turnstile for entrance operation. The contact member 110 also completes a holding circuit for the winding 128 and the current travels as before described, to wire 120, thence to wire 119 to the winding 128 and finally to ground at 127. Thus, even after the coin is released down the chute, solenoids 109 and 128 remain energized until the passenger has moved the turnstile sufficiently to displace the contact 134 from under the spring fingers. When this occurs the two solenoids are deenergized and the parts returned to their normal position with the exception of the plunger 129 which does not drop into one of the recesses 136 until the turnstile has completed a one-quarter revolution. The passenger is then completely through the turnstile and within the restricted area of the station platform or car platform. The token which is delivered to him is removed from the cup as he passes through the turnstile. This token represents by its size and shape the particular zone in which he entered the system.

In Fig. 10 I have shown the particular type of token and/or coin control device which will be disposed adjacent the exit turnstile of all of the stations of zone 1. If the passenger entered the system at one of the stations of zone 1 and desires to depart from another station in the same zone, he deposits the token which he received into the chute 141 where it falls into chute 144 and lodges between the lowermost contacts thereon. The current then travels from the positive side of the current source through wire 150, through the token to wire 158 and thence to ground at 151, through the winding 149. This energizes the winding 149 and causes it to move the rod 148 to the right and release the token. At the same time that this circuit is completed, the current travels through wire 152 to one terminal of the winding 211 of its associated exit turnstile. The operation of this turnstile has been previously described. If a passenger entered the system in zone 2 and desires to depart from it to zone 1, he deposits his token in the chute 141 where it falls between the middle set of contacts in chute 144. He also deposits a five cent piece which lodges between the lower contacts in chute 143. The current then travels from the wire 150 through the token to wire 157 through the five cent piece to wire 159 and thence through the coil 149 to ground and through the wire 152 to the exit turnstile. If he entered the system in zone 3, the token which he has received lodges between the upper set of contacts and he also deposits two five cent pieces which fall into chute 143 or a single ten cent piece which falls into chute 142. The current then travels from wire 150 through the token to wire 154, wire 155, through the middle set of contacts in chute 143 to wire 159 and thence to ground at 151 through the winding 149. The current also travels through wire 152 to the exit turnstile. If a ten cent piece was deposited rather than two five cent pieces, the current travels through wire 154, through the ten cent piece and thence to ground and to the exit turnstile. If the passenger has lost his token he may deposit three five cent pieces in chute 143. The current will then travel through wire 156, the upper coin to wire 159 and thence to ground at 151 and through the wire 152 to the exit turnstile.

In Fig. 11 I have shown the exit device to be placed adjacent all the exit turnstiles of zone 2. If the passenger enters the system in zone 1, he deposits his token in the chute 161 from which it falls to 164 and lodges between the lowermost set of contacts. Since he is now in zone 2, he must deposit a five cent piece in chute 163. The current then travels from wire 172 through the token to wire 173 through the five cent piece to wire 176 and thence to ground at 170, through the winding 169. This energizes the winding to cause the rod 168 to move to the right and release the token and coin. The completion of this circuit also permits the current to travel from wire 176 to wire 171 which is connected to the exit turnstile as before. If the passenger has entered the system in zone 2 and desires to leave it in the same zone, his token, when deposited in the chute 164, will lodge between the central set of contacts. The current will then travel from wire 172 through the token to wire 175, wire 176, and thence to ground at 170 through the winding 169. The current will also travel on the completion of this circuit to the wire 171 as before. If the passenger enters the system in zone 3 and desires to make his exit therefrom in zone 2, he deposits his token in chute 164 where it lodges between the uppermost set of contacts. He also deposits a five cent piece in chute 163. The current travels from wire 172, to wire 173, through the token and then through the five cent piece to wire 176 and finally, to ground at 170 through the coil 169. The current also travels to wire 171 as before. If the passenger has lost his token, he may make his exit from any station in zone 2 by depositing two five cent pieces in chute 163. The current then travels from wire 174 through the upper coin to wire 176 and thence to ground at 170 through the winding 169. Instead of depositing two five cent pieces he may deposit a ten cent piece in chute 162. The current then travels from wire 178 through the coin to wire 177, wire 176 and thence to ground at 170 through the winding 169. In both these cases the current also travels to wire 171 to operate the exit turnstile. It may be pointed out in connection with the previous operations that each time the winding 169 is energized, the rod 168 moves to the right to release any tokens and coins that may be in the chutes.

I have shown in Fig. 12, the token and coin controlled device to be placed adjacent the exit turnstiles of zone 3. If the passenger has entered the system in zone 1, he deposits the token which he received in chute 181 from which it falls into chute 184 and lodges between the lowermost set of contacts. He also deposits two five cent pieces in chute 183 or a ten cent piece in chute 182. Assuming he has deposited two five cent pieces, the current travels from wire 192 through the token to wire 194, wire 196 through the coin at the middle set of contacts on chute 183 to wire 198, wire 193, and thence to ground at 190 through the coil 189. The current also travels to the releasing winding of the exit turnstile through wire 191. If he deposited a ten cent piece rather than two five cent pieces, the current travels through wire 194 to the ten cent piece, wire 197, and thence to ground at 190 through the winding 189. The current also travels to the exit turnstile through wire 191. If the passenger entered the system at zone 2, the token which he deposits in chute 184 will lodge between the central set of contacts. He also deposits a single five cent piece in chute 183. The current then travels through wire 192 through the token to wire 195, through the five cent piece lodged between the lower set of contacts in chute 183 to wire 198, wire 193, and thence to ground at 190 through the winding 189. The current also travels to wire 191 through the wire 197. If the passenger entered the system in zone 3, his token will lodge between the upper set of contacts in chute 184. The current will then travel through wire 192 to wire 195′ through the token to wire 193 and thence to ground at 190, through the winding 189. The current also travels to wire 191 through the wire 197. Should the passenger lose his token, he may deposit three five cent pieces in the chute 183 which will complete a circuit from wire 196′ through the upper set of contacts of chute 183 to wire 198, wire 193, winding 189 to ground at 190. The current will also travel to wire 191 through wire 197. In all of these cases as before, the energization of the winding 189 will move the rod 188 to the right to release any tokens and coins which may be in the chutes.

In order to adapt the principles of my invention to systems which use the prepayment idea, I have devised the device disclosed in Figs. 19 to 24 inclusive. The complete assemblage of such a device is shown in plan view in Fig. 19. In an actual installation I propose to provide one of these devices which I term a multiple token magazine device adjacent each entrance turnstile of each station in each zone. A passenger can then, knowing the particular zone to which he intends to travel, deposit the total amount representing the fare to that point and receive from the proper cup a token which will permit his exit from any station of that zone. In Fig. 20 I have shown the operating mechanism disposed adjacent the magazine 227 for delivering a token which will permit the exit of the passenger from any station in zone 1. It must be kept in mind that the device as wired in Figs. 20, 21 and 22 is adapted for use in zone 2. Thus, by depositing in chute 230, a ten cent piece or two nickels, the passenger will receive a token which will permit his exit from any station in zone 1. The deposited coins complete the circuit as follows: If a ten cent piece is used, the current flows from wire 248 connected to the positive side of the current source through wire 247, the ten cent piece, wire 246, wire 238 and thence to ground. If two five cent pieces are deposited in chute 232, the current travels through wire 248, the upper five cent piece, wire 238 and thence to ground at 237 through the winding 236. This energizes the coil and draws the plunger 235 to the left ejecting a token from the magazine 227. This movement of the rod 235 also causes the contact member 244 to bridge the two terminals 242 and 243. This provides a holding circuit for the coil 236 and the releasing coil on the entrance turnstile as described before. A holding circuit is necessary since the movement of the rod 235 releases the coins and permits them to fall down the chute. The holding circuit is as follows: The current travels from wire 248 through the contacts of the chute in which the coin has been deposited to wire 238 and then travels on either wire 245, terminal stud 243, contact member 244, terminal stud 242, conductor 241 and wire 239 to the contact finger on the entrance turnstile as previously described. The current travels also from the positive side of the current source to the wire 240 through the wire 238 and thence to the releasing coil of the entrance turnstile.

When a coin is deposited in chute 251, (see Fig. 21), it falls into chute 253 and establishes a circuit to operate the entrance turnstile and eject a token characteristic or representative of zone 2. It will be remembered that Figs. 20, 21 and 22 are cross-sectional views on the corresponding lines of Fig. 19 representing the parts of the multiple token magazine device to be disposed adjacent the entrance turnstile of all the stations of zone 2. The deposit of the coin in the chute 253 completes a circuit from wire 248 through the coin to wire 262 and thence to ground at 261 through the winding 260. This causes the ejection of a zone 2 token from the magazine 228, releases the coin in chute 253 and completes the holding circuit connected to the terminal studs 258 and 259. The terminal stud 258 connects to the wires 263 and 239 to the spring fingers on the entrance turnstile forming part of the holding circuit. The wire 262 supplies current through the wire 240 to energize the release winding of the entrance turnstile.

The arrangement in Fig. 22 represents the token delivering device for delivering tokens which will permit the exit of the passenger from zone 3. The passenger by depositing a ten cent piece in chute 271, or two five cent pieces in chute 272 receives a token and is permitted to enter the zone 2 station. If two five cent pieces are deposited, the current travels from the wire 248 through the upper coin in chute 272, through wire 262 and thence to ground at 281 through the wire 282 and the winding 280. This causes a token to be ejected from the magazine 229, the coins to be released from the chute 272 and the holding circuit to be completed as before. If a ten cent piece is deposited in chute 271, the current travels from wire 248, through wire 284' to the coin in chute 271, through wire 284, wire 262, and thence to ground at 281 through the winding 280. The operation is as before. The wire 263 is connected to the contact fingers on the entrance turnstile through the wire 239 and wire 262 carries current to the releasing coil of the entrance turnstile through wire 240.

Fig. 23 discloses the wiring connections for the multiple token magazine device to be used in zone 1. In view of all the previous detailed description, it is believed that the description of these circuits need not be gone into minutely. The connections to winding 304 show the arrangement of the parts to eject a token for zone 1 upon the deposit of a five cent piece. The current travels from the positive side of the current source through wire 312, the five cent piece, wire 303, winding 304 to ground at 305. The holding circuit is again closed as before and the coin released and the current travels through wire 303 to conductor 301 which is connected to the releasing coil of the entrance turnstile. The winding 315 is energized to deliver a token for zone 2 upon the deposit of a ten cent piece or two five cent pieces. If two five cent pieces are used the current travels from wire 312 through the upper five cent piece to wire 314, and then through wire 314' to ground at 316 through the winding 315. If a ten cent piece is used, current travels through wire 312, wire 319', the ten cent piece, wire 322', wire 314, wire 314' and thence to ground 316, through the winding 315. In either case the token is ejected and the turnstile released as before to permit the movement of the passenger through the entrance turnstile. The coins are also released and the holding circuit is formed as previously described. To secure a token for the third zone, three five cent pieces, or one ten cent piece and one five cent piece are employed to energize the winding 325. If three five cent pieces are used the current travels through wire 312, the upper five cent piece, wire 324 and thence to ground at 326, through the winding 325. If a ten cent piece and one five cent piece are used, the current travels through wire 312, the single five cent piece, wire 333, the ten cent piece, wire 322, wire 324, to ground at 326, through the winding 325. The energization of the coil 325 ejects the third zone token, releases the coin, closes the holding circuit as before and releases the turnstile for entrance operation.

The circuit arrangements for the multiple token magazine devices to be placed at all the stations of zone 3, are shown in Fig. 24. The connections to winding 344 are exactly the same as the connections to winding 325 of Fig. 23. This winding when energized causes the ejection of a zone 1 token. The similarity in connections is immediately apparent when it is pointed out that it costs the same amount of money to travel from zone 1 to zone 3, as it does to travel from zone 3 to zone 1. The connections to coil 357 are the same as those to coil 315 of Fig. 23 since it costs the same amount to travel from zone 3 to zone 2 as it does from zone 2 to zone 3. The connections to winding 371 are the same as the connections to winding 304 of Fig. 23, since it costs the same amount to travel to any point in zone 3 from any other point in zone 3 as it does to travel from one point in zone 1 to any other point in zone 1. The winding 344 is disposed adjacent the third zone token magazine, the winding 357 is placed adjacent the second zone token magazine and the winding 371 is placed adjacent the first zone token magazine. It will be apparent that the circuits of Figs. 23 and 24 are the same with the exception that the respective parts are reversed with respect to the same token magazines.

A brief description will now be given of the modified token and/or coin control device disclosed in Figs. 25, 26 and 27.

The device of Fig. 25 represents the type which will be disposed adjacent the exit turnstiles of all the stations in zone 1. If a passenger has a zone 1 token, he deposits it in the chute 406 where it lodges between the lowermost set of contacts. The current flows from the positive side of the current source through wire 410 to wire 413, through the token and thence to ground at 409, through the winding 408. This energizes the winding 408 causing the plunger 407 to move to the right to release the token. At the same time, this circuit is completed, the current flows through wire 415' to the winding which releases the exit turnstile. If the passenger has a zone 2 token, it will, when deposited in the chute 406, lodge between the middle set of contacts. He must also deposit five cents in addition in order to make his exit from the zone 1 station. The current travels through wire 410 to wire 412 through the token and thence through the five cent piece which lodges on the first hump in the chute of 403, between the third pair of contacts from the top and travels on to wire 413, finally reaching ground at 409 through the winding 408. The current also travels to the exit turnstile through wire 415'. If the passenger deposits a third zone token in chute 406, it will lodge between the uppermost set of contacts. The current travels from wire 410 to wire 411 through the token and thence through the five cent piece lodged between the second set of contacts from the top of chute 403 and travels on to ground at 409, through the wire 413 and the winding 408. The releasing coil of the exit turnstile is also energized through wire 415'. In addition to the deposit of the third zone token, it is pointed out that two five cent pieces must have been deposited in chute 403. If the passenger instead of depositing two five cent pieces in chute 403 deposits a ten cent piece, it will lodge between the lowermost set of contacts and complete the circuit from wire 411 through wire 414, the ten cent piece, wire 413, winding 408 and thence to ground at 409. This also supplies current to the wire 415'. If the passenger has lost his token, he may effect his exit from the station by depositing three five cent pieces in chute 403. The current then travels through wire 415, the upper five cent piece, wire 413, winding 408 to ground at 409. Wire 415' is also energized. In Fig. 26 I have shown the token and coin controlled device to be used in zone 2 stations. If a zone 1 token is deposited in the chute 421, and a five cent piece deposited in chute 419, the current will travel from wire 426 to wire 428, through the token and through the five cent piece held in the chute on the first hump to wire 429 and finally to ground at 425 through the winding 424. This also supplies current to wire 430 which is connected to the releasing coil of the exit turnstile. If a zone 2 token is deposited it will lodge between the middle set of contacts in chute 421. The current then flows from wire 426 to wire 428' through the token and thence to ground at 425, through the winding 424. This also energizes wire 430. If a zone 3 token is deposited in chute 421 it will stop between the uppermost set of contacts and the current will travel through wire 426 to wire 427, through the token to a five cent piece which must also be deposited in chute 419 and thence to ground at 425, through wire 429 and winding 424. If the passenger has lost his token he may deposit a ten cent piece in chute 419 which will complete the circuit through wire 431, wire 431', ten cent piece, wire 429, winding 424 and wire 425 to ground. He may deposit instead of the ten cent piece, two five cent pieces to complete a circuit through wire 431, the upper five cent piece, wire 429, winding 424 and wire 425 to ground. In each of these cases the wire 430 is energized to operate the exit turnstile.

In Fig. 27 I have disclosed the coin and token control devices to be used in zone 3. If a zone 1 token is deposited in chute 440, it will be held between the lower set of contacts. The current will then flow through wire 450 to wire 446, through the token to the five cent piece which lodges between the second set of contacts from the top of chute 438. It will be remembered that since the passenger has a zone 1 token, and he is attempting to make his exit from zone 3, he must deposit two five cent pieces, plus the token to get out. The current continues from the contacts adjacent the upper of the two five cent pieces to wire 448 and thence to ground at 444 through the winding 443. If the passenger has deposited a ten cent piece instead of the two five cent pieces, the current will travel from wire 446 through wire 449, the ten cent piece, wire 448, winding 443 to ground at 444. If the passenger deposits a zone 2 token in chute 440, it will lodge between the middle set of contacts. With such a token he must also deposit a five cent piece in chute 438. The circuit is then completed through wire 450 to wire 447 through the token and thence to wire 448 through the five cent piece to ground at 444, through the winding 443. Now then, if a zone 3 token is deposited in chute 440, it will stop between the upper set of contacts to complete a circuit from wire 450 to wire 445 through the token and thence to ground at 444 through the winding 443. If the passenger has lost his token he may deposit three five cent pieces in chute 438 to permit his exit by completing a circuit from wire 452 through the upper five cent piece to wire 448 and finally to ground at 444 through the winding 443. In all the previous cases upon the completion of a circuit to energize the winding 443, the current also travels through wire 453 to the releasing coil of the exit turnstile.

Fig. 28 discloses the arrangement of the exit and entrance barriers arranged so as to control the movement of passengers to and from a restricted area. It will be evident that this arrangement may be employed either on the platform of buses or on the platform of passenger vehicle stations of any type. I have disclosed at A. an entrance turnstile arranged adjacent to a restricted passage-way formed by means of a frame work comprising two parallel bars 501. The turnstile barrier arms are arranged to project across the passage-way formed by the bars. Mounted adjacent the turnstile A. and the restricted passage-way is a coin operated token delivering device 503 which is similar in construction to those previously described. The restricted area is shown at the left of the turnstile structure and is marked off by means of the turnstiles and the connecting pipe or similar frame work 504, 505 and 506. Upon passing in the direction of the arrow through the restricted passage-way after the deposit of the coin, a passenger may move into the restricted area at the left and during this movement, secure the token from the cup on the side of the device 503. It is evident that a number of these entrance turnstiles may be arranged in alignment. The barrier or turnstile B. shown adjacent the restricted passage-way formed by the parallel frame work 505, controls the exit movement of the passengers and is adapted to be released for exit operation upon the deposit of a token and/or coins in the control box 502. It is evident also that a number of these exit barriers may be arranged in alignment to meet the particular demands on the station with which they are associated.

It will also be evident that the entrance and exit barriers may be arranged in a single group in alignment or the entrance barriers may be separated spacially from the exit barriers. I can, of course, arrange the barriers so that the same barriers which are coin or token controlled for entrance, may be arranged for coin and/or token exit operations. In other words, each entrance turnstile may be also operated as an exit turnstile by connecting it to a suitable token and/or coin operated device.

I wish it to be particularly understood that the principles of my invention are not limited to the particular turnstile barrier shown by me since any form of movable gate or even doors may be readily operated by means of the apparatus of my invention. It may be pointed out, at his point, that while I have disclosed the device which operates the entrance turnstile as being controlled by means of a coin, it will be immediately apparent that this device could be operated by means of tokens which could be sold in quantities as is often done at the present time. In fact any metallic object of proper size and shape would be suitable for operating these devices and I do not therefore desire to be limited to coins since I am using this term in an illustrative sense in both the specification and claims.

It will be apparent from the foregoing disclosure that I have devised a very simple and efficient system for permitting the zoning of all types of transportation systems, including bus systems whereby the passenger may be charged in proportion to the length of the trip which he takes.

By means of the apparatus of my invention it is at once apparent that I have eliminated the necessity of employing conductors or attendants which are usually necessary in the operation of such systems and which represent a considerable portion of the operating expense of such a system.

I have also eliminated the use of tickets, etc. and have substituted for all of these, a simple metallic token, representing by its size and color the particular zone at which it was delivered. The passenger therefore has only to deposit one or more coins of a predetermined value to receive a token and gain admittance to the restricted areas of the platforms or the bus or car platforms. He has also only to deposit that token with or without additional coins depending on how far he has traveled to effect his exit from any other station or point of the system.

I also intend to include within the scope of my invention, the idea of arranging exit and entrance turnstiles in combination with controlling devices to permit the transfer of a passenger from one system to another, thus, if the passenger is riding on an elevated train for instance, and desires to transfer to a subway train at a transfer point, he may, by depositing the token which he has in apparatus provided therefor, secure a transfer token at the same time he makes his exit from the elevated system. This transfer token when deposited in a suitable device adjacent the entrance turnstile subway system will permit his passage therethrough and will cause the ejection of a token which will permit his exit from any station of the subway system either alone or in combination with one or more coins. It will be apparent that apparatus for these operations will not differ in any great detail from the present token operated devices. The only important difference will be, that the device which controls the exit turnstile of the first system at the transfer point, will be adapted to deliver a transfer token of suitable characteristics which will permit the passenger's entrance to the restricted area of the subway system at the transfer point. The device which controls the entrance turnstile to the subway at the transfer point will be particularly adapted for operation by the transfer token and will also be adapted to deliver a token of suitable characteristics for use on the subway system. The principles of my invention can, of course, be applied at the transfer points from and to any types of common carrier systems.

While I have disclosed in connection with the apparatus to be applied to buses and other road vehicles as being operated from some moving part of the vehicle, I wish it to be understood that the token delivering device could be manually rotated, mechanically rotated or pneumatically rotated, as well as electrically as I have described it in connection with the present disclosure.

I am, of course, very well aware that many changes in the detail of construction, relative arrangement of parts and circuital connections will readily occur to those skilled in the art and I do not therefore desire to be limited to these particular features as disclosed by me for purposes of illustration. This is particularly apparent in connection with the wiring of the different coin and/or token operated devices since the number and arrangements of circuits will depend upon the number of zones in a given station. I, therefore, only desire and intend to be limited to the aspects of my invention as I have defined them in the appended claims.

What I seek to secure by United States Letters Patent is:

1. In a passenger vehicle system, the combination with a restricted area having a plurality of entrance and exit ways and barriers in said ways of means associated with each of said entrance ways for delivering a token and releasing one of said entrance barriers to permit the movement of a passenger through said barrier into said restricted area, said token being adapted to operate said exit barriers.

2. In a passenger vehicle system divided into a plurality of zones, the combination with a plurality of restricted areas in each zone, having a plurality of restricted entrance and exit ways for each area, and one or more barriers in each of said ways, of means adjacent each of said entrance ways for delivering a token and permitting a passenger to move through one of said entrance ways upon the deposit of a coin and means adjacent each of said exit ways for permitting the movement of a passenger through one of said exit ways upon the deposit of coins, a token or coins and a token.

3. In a passenger vehicle system divided into a plurality of zones, the combination with a plurality of restricted areas in each zone, having a plurality of restricted entrance and exit ways for each area and one or more barriers in each of said ways of means adjacent each of said entrance ways for delivering a token and permitting a passenger to move through one of said entrance ways upon the deposit of a coin and means adjacent each of said exit ways for permitting the movement of a passenger through any exit way of the same zone in which he received his token upon the deposit of that token.

4. In a passenger vehicle system divided into a plurality of zones, the combination with a plurality of restricted areas in each zone, having a plurality of restricted entrance and exit ways for each area and one or more barriers in each of said ways, of means adjacent each of said entrance ways for delivering a token and permitting a passenger to move through one of said entrance ways upon the deposit of a coin, and means adjacent each of said exit ways for permitting the movement of a passenger through one of said exit ways upon the deposit of the token which he received on entering the system.

5. In a passenger vehicle system divided into a plurality of zones, the combination with a plurality of restricted areas on each zone having a plurality of exit ways for each area of each zone, and barriers in said ways, of means adjacent each exit way for permitting the exit of a passenger through its associated way upon the deposit of a token, coin, or a token and coins.

6. In a passenger vehicle system, the combination with a restricted area having a plurality of entrance and exit ways and barriers in said ways and electrical means associated with each of said entrance ways for delivering a token and releasing one of said entrance barriers to permit the movement of a passenger through said barrier into said restricted area, said token being adapted to operate the said exit barriers.

7. In a passenger vehicle system divided into a plurality of zones, the combination with a plurality of restricted areas in each zone, having a plurality of restricted entrance and exit ways for each area and one or more barriers in each of said ways, of means adjacent each of said entrance ways for delivering a token and permitting a passenger to move through one of said entrance ways upon the deposit of a coin, and electrical means adjacent each of said exit ways for permitting the movement of a passenger through one of said exit ways upon the deposit of coins, a token or coins and a token.

8. In a passenger vehicle system divided into a plurality of zones, the combination with a plurality of restricted areas in each zone, having a plurality of restricted entrance and exit ways for each area and one or more barriers in each of said ways, of means adjacent each of said entrance ways for delivering a token and permitting a passenger to move through one of said entrance ways upon the deposit of a coin, and electrical means adjacent each of said exit ways for permitting the movement of a passenger through any exit way of the same zone in which he received his token upon the deposit of that token.

9. In a passenger vehicle system divided into a plurality of zones, the combination with a plurality of restricted areas in each zone, having a plurality of restricted entrance and exit ways for each area and one or more barriers in each of said ways, of means adjacent each of said entrance ways for delivering a token and permitting a passenger to move through one of said entrance ways upon the deposit of a coin, and electrical means adjacent each of said exit ways for permitting the movement of a passenger through one of said exit ways upon the deposit of the token which he received on entering the system.

10. In a passenger vehicle system divided into plurality of zones, the combination with a plurality of restricted areas in each zone having a plurality of exit ways for each area of each zone and barrier in said ways, of electrical means adjacent each exit way for permitting the exit of a passenger through the associated way upon the deposit of a token, coins, or a token and coins.

11. The combination with entrance and exit ways and barriers in said ways, of means for delivering a token and releasing the entrance turnstile upon the deposit of a coin, and means for operating the exit barriers upon the deposit of said token or said token and coins.

12. In a zoning system comprising a plurality of zones, each having a plurality of restricted areas, of entrance and exit ways for each of said areas, and barriers in said ways, of means adjacent the entrance barriers for delivering a token and releasing any of said entrance barriers upon the deposit of a coin or coins, and means for releasing any of said exit barriers upon the deposit of said token or said token and coins.

13. In a passenger vehicle system divided into a plurality of fare zones, the combination with a plurality of restricted areas in each zone, a plurality of restricted entrance and exit ways for each area and barriers in said ways, of means adjacent each of the entrance ways for delivering a token upon the deposit of a coin therein, connections between said means and said entrance ways also actuated upon the deposit of the coin for releasing the barriers in said entrance ways to permit a passenger to move therethrough, and means adjacent each exit way for permitting the release of the barrier therein upon the deposit of the token received when entering the system if exit is made from the same zone as entrance was made or upon the deposit of the token and a coin of required denomination depending upon the number of zones traveled.

In testimony whereof I have hereunto set my hand on this 20th day of January A. D., 1927.

JOHN W. HULME.